(12) United States Patent
Hira et al.

(10) Patent No.: US 7,182,896 B2
(45) Date of Patent: Feb. 27, 2007

(54) COMPOSITE FOAMED POLYPROPYLENE RESIN MOLDING AND METHOD OF PRODUCING SAME

(75) Inventors: Akinobu Hira, Kanuma (JP); Keiichi Hashimoto, Utsunomiya (JP); Hidehiro Sasaki, Tochigi-ken (JP)

(73) Assignee: JSP Corporation, Tokyo (JP)

( * ) Notice: Subject to any disclaimer, the term of this patent is extended or adjusted under 35 U.S.C. 154(b) by 160 days.

(21) Appl. No.: 10/502,934

(22) PCT Filed: Mar. 19, 2003

(86) PCT No.: PCT/JP03/03318

§ 371 (c)(1),
(2), (4) Date: Jul. 29, 2004

(87) PCT Pub. No.: WO03/078127

PCT Pub. Date: Sep. 25, 2003

(65) Prior Publication Data
US 2005/0056957 A1    Mar. 17, 2005

(30) Foreign Application Priority Data
Mar. 19, 2002  (JP) .............................. 2002-077383

(51) Int. Cl.
*B29C 44/04*  (2006.01)
(52) U.S. Cl. ........................ 264/45.4; 264/45.1; 264/51
(58) Field of Classification Search ............... 264/45.4, 264/51, 53, 126, 45.1
See application file for complete search history.

(56) References Cited

U.S. PATENT DOCUMENTS 3,953,558 A    4/1976    Hatano et al. ................. 264/22

(Continued)

FOREIGN PATENT DOCUMENTS

DE    100 48 399    5/2001

(Continued)

OTHER PUBLICATIONS

Patent Abstracts of Japan, vol. 1999, No. 9, Jul. 30, 1999.

(Continued)

*Primary Examiner*—Allan R. Kuhns
(74) *Attorney, Agent, or Firm*—Bacon & Thomas, PLLC

(57) ABSTRACT

A composite foamed polypropylene resin molding including a plurality of sections which are fuse-bonded to each other, at least two of which differ from each other in color, apparent density, composition and/or mechanical strengths, each of which is formed from expanded polypropylene resin beads, and each of which shows a high temperature endothermic peak in a DSC curve thereof. At least one of the sections satisfies conditions (d) to (f) at the same time: (d) to be formed from specific expanded polypropylene resin beads of a base resin having a tensile modulus of at least 1,200 MPa, (e) to have an apparent density $D2$ of 10–500 g/L, and (f) to have such a high temperature endothermic peak with a calorific of $E2$ J/g, wherein $D2$ and $E2$ have the relationship $20-0.020 \times D2 \leq E2 \leq 65-0.100 \times D2$. The composite molding may be prepared by filling expanded polypropylene resin beads in each of a plurality of contiguous spaces defined in a mold cavity and heating the expanded beads to fuse-bond respective expanded beads together into a unitary body. At least one of the spaces is filled with the specific expanded polypropylene resin beads.

3 Claims, 4 Drawing Sheets

U.S. PATENT DOCUMENTS

| | | | |
|---|---|---|---|
| 4,379,859 A | 4/1983 | Hirosawa et al. | 521/59 |
| 4,440,703 A | 4/1984 | Akiyama et al. | 264/50 |
| 4,464,484 A | 8/1984 | Yoshimura et al. | 521/58 |
| 4,602,082 A | 7/1986 | Akiyama et al. | 528/481 |
| 4,617,323 A | 10/1986 | Kuwabara et al. | 521/60 |
| 4,695,593 A | 9/1987 | Kuwabara et al. | 521/60 |
| 4,704,239 A | 11/1987 | Yoshimura et al. | 264/50 |
| 4,711,287 A | 12/1987 | Kuwabara et al. | 164/34 |
| 4,777,000 A | 10/1988 | Kuwabara et al. | 264/51 |
| 4,840,973 A | 6/1989 | Kuwabara et al. | 521/58 |
| 5,032,620 A | 7/1991 | Arai et al. | 521/60 |
| 5,252,270 A | 10/1993 | Haardt et al. | 264/45.4 |
| 5,468,781 A | 11/1995 | Sugano et al. | 521/60 |
| 5,716,998 A | 2/1998 | Minakata et al. | 521/58 |
| 5,747,549 A | 5/1998 | Tsurugai et al. | 521/60 |
| 6,034,144 A | 3/2000 | Shioya et al. | 521/60 |
| 6,051,617 A | 4/2000 | Sasaki et al. | 521/59 |
| 6,077,875 A | 6/2000 | Sasaki et al. | 521/60 |
| 6,313,184 B1 | 11/2001 | Sasaki et al. | 521/56 |
| 6,355,696 B1 | 3/2002 | Yamaguchi et al. | 521/56 |
| 6,451,419 B1 | 9/2002 | Tsurugai et al. | 428/304.4 |
| 6,619,943 B1 | 9/2003 | Sameshima et al. | 425/130 |
| 6,983,964 B2 | 1/2006 | Murata et al. | |
| 2003/0034580 A1 | 2/2003 | Sasaki et al. | 264/51 |
| 2003/0124335 A1 | 7/2003 | Sasaki et al. | 428/316.6 |
| 2003/0162012 A1 | 8/2003 | Sasaki et al. | 428/323 |
| 2003/0171455 A1 | 9/2003 | Tezuka et al. | 523/218 |
| 2004/0056491 A1 | 3/2004 | Murata et al. | 293/120 |

FOREIGN PATENT DOCUMENTS

| | | |
|---|---|---|
| EP | 0 775 722 A | 5/1997 |
| EP | 0 841 155 A | 5/1998 |
| EP | 0 879 844 A1 | 5/1998 |
| EP | 0 918 966 A | 5/1999 |
| JP | 10-45938 | 2/1998 |
| WO | 02/24794 | 9/2001 |

OTHER PUBLICATIONS

U.S. Appl. No. 10/855,633, filed May 28, 2004, Hashimoto et al.

COMPOSITE FOAMED POLYPROPYLENE RESIN MOLDING AND METHOD OF PRODUCING SAME

TECHNICAL FIELD

This invention relates to a composite foamed polypropylene resin molding and to a method of producing same.

BACKGROUND ART

A polypropylene resin is now increasingly utilized in various fields because of excellent mechanical strengths, heat resistance, chemical resistance, machinability, cost balance and recyclability thereof. Foamed moldings of a base resin including a polypropylene resin (hereinafter referred to simply as "PP moldings" or "polypropylene resin moldings"), which retain the above excellent properties and which have excellent additional characteristics such as cushioning property and heat insulating properties, are thus utilized for various applications as packaging materials, construction materials, heat insulation materials, etc. In particular, PP moldings obtained by heating expanded beads of a base resin including a polypropylene resin (hereinafter referred to as "expanded PP beads" or "expanded polypropylene resin beads") in a mold are now used as bumper cores and door pats of automobiles because of their good shock absorbing properties and moldability.

Thus, a need for light weight and high rigidity PP moldings is increasing in this field. In one structure of such PP moldings, a dual density molding is known which has a relatively high density section and a relatively low density section. Because of the presence of the low density section, the dual density molding has a reduced weight as a whole as compared with a structure in which no such a low density section is present and is advantageously utilized as a high functional bumper core in which offset collision and pedestrian protection are taken into account. One typical dual-density molding has a center low density section which is sandwiched between a pair of high density sections. In the production of such a dual-density molding, high density expanded PP beads and low density expanded PP beads are filled in predetermined spaces of a mold cavity and are heated to fuse-bond the expanded PP beads into a unitary structure, as disclosed in U.S. Pat. No. 5,164,257, Japanese Laid-Open Patent Publications No. H11-334501 and 2001-150471 and Japanese Utility Model Examined Publication S62-22352. The thus obtained foamed molding is then cooled and taken out of the mold.

Such a dual density PP molding is, however, apt to expand to a size greater than the mold cavity, when the molding is not sufficiently cooled after the fuse-bonding of expanded PP beads has been completed. The PP molding is also apt to shrink to a size smaller than the mold cavity, when the molding is excessively cooled after the fuse-bonding of expanded PP beads has been completed. Thus, depending upon the degree of cooling, the dual density PP molding expands or shrinks. In this case, since a relatively low density section is more quickly cooled than a relatively high density section, the low density section is more likely to shrink, when the cooling of the molding is carried out evenly. Since expansion is less desirable than shrinkage, the cooling is generally carried out while preventing expansion of the high density section. Thus, the shrinkage of the low density section is generally unavoidable in the case of production the dual density PP molding unless specifically controlled cooling conditions are adopted.

DISCLOSURE OF THE INVENTION

The present invention has been made in view of the problems of the conventional methods.

In accordance with the present invention, there is provided a method of producing a composite foamed polypropylene resin molding, comprising:

providing a mold having a mold cavity including a plurality of contiguous spaces;

filling expanded beads of a base resin including a polypropylene resin in each of said spaces; and heating said expanded beads in each of said spaces to fuse-bond respective expanded beads together into a unitary body;

wherein each of said expanded beads shows a high temperature endothermic peak, in a DSC curve thereof, in addition to an intrinsic endothermic peak located at a lower temperature side of said high temperature peak, and wherein those expanded beads which are filled in at least one of said spaces are specific expanded beads which satisfy the following conditions (a) to (c) at the same time:

(a) said specific expanded beads are formed of a base resin having a tensile modulus of at least 1,200 MPa, (b) the high temperature endothermic peak of said specific expanded beads has an apparent density $D1$ g/L which is not smaller than 10 g/L but not greater than 700 g/L, and (c) the high temperature endothermic peak of said specific expanded beads has such an area that corresponds to a calorific of $E1$ J/g, wherein $D1$ and $E1$ have the following relationship $$20-0.014 \times D2 \leq E1 \leq 65-0.072 \times D1.$$

In another aspect, the present invention provides a composite foamed polypropylene resin molding comprising a plurality of sections which are fuse-bonded to each other and at least two of which differ from each other in at least one characteristic selected from color, apparent density, composition and mechanical strengths, wherein each of said sections is formed from expanded beads of a base resin including a polypropylene resin, wherein each of said sections shows a high temperature endothermic peak, in a DSC curve thereof, in addition to an intrinsic endothermic peak located at a lower temperature side of said high temperature peak, wherein at least one of said sections satisfies the following conditions (d) to (f) at the same time:

(d) that section is formed from specific expanded polypropylene resin beads of a base resin having a tensile modulus of at least 1,200 MPa, (e) that section has an apparent density $D2$ g/L which is not smaller than 10 g/L but not greater than 500 g/L, and (f) the high temperature endothermic peak of that section has such an area that corresponds to a calorific of $E2$ J/g, wherein $D2$ and $E2$ have the following relationship $$20-0.020 \times D2 \leq E2 \leq 65-0.100 \times D2.$$

BRIEF DESCRIPTION OF THE DRAWINGS

The present invention will now be described in more detail below with reference to the accompanying drawings, in which.

DESCRIPTION OF PREFERRED EMBODIMENTS OF THE INVENTION

Figure 1:
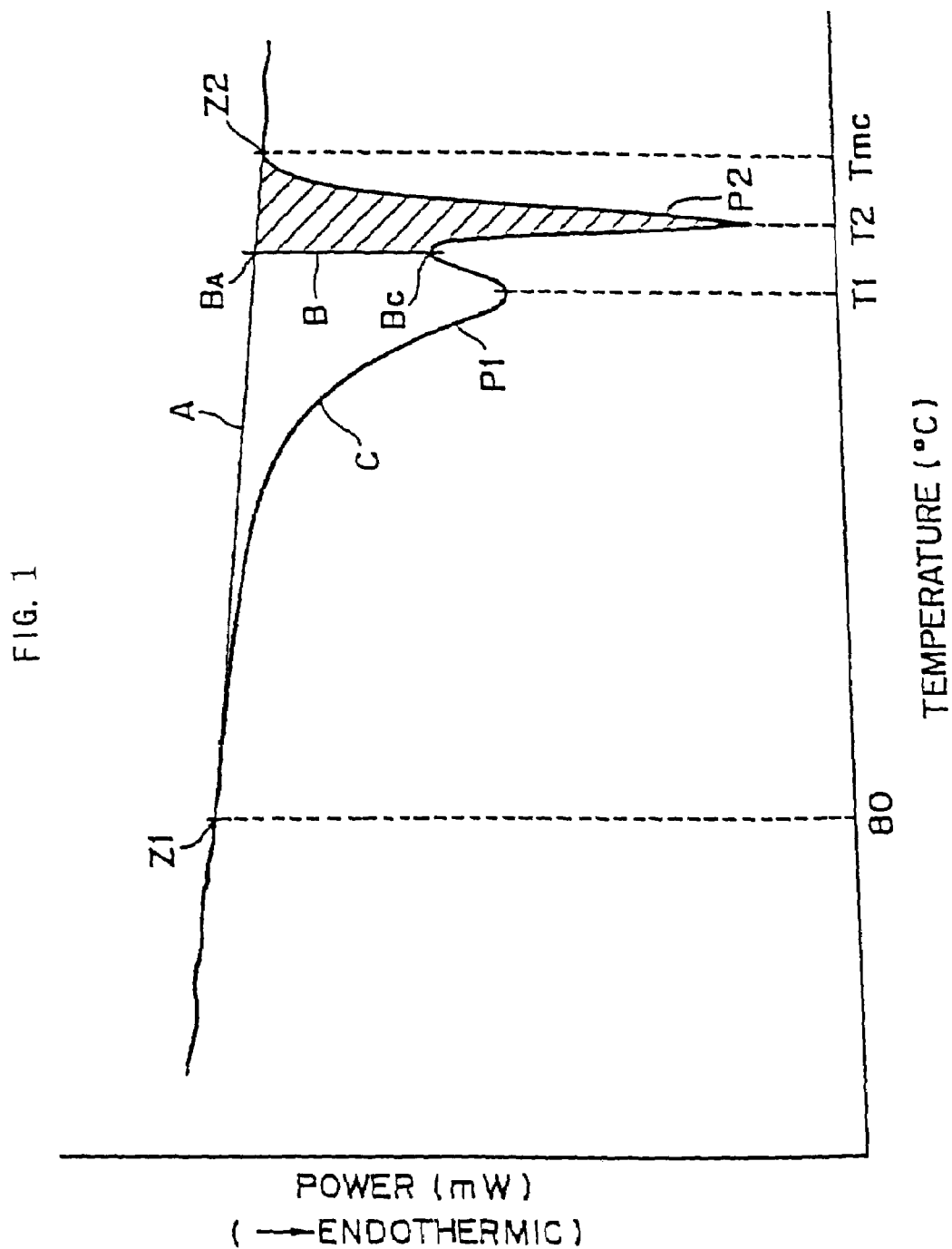
FIG. 1 is an initial DSC curve of expanded polypropylene resin beads.

A composite PP molding of the present invention comprises at least two sections which are fuse-bonded to each other and which differ from each other in at least one characteristic selected from color, density, composition and mechanical strengths. Each of the sections is made from expanded PP beads of a base resin including a polypropylene resin. The expanded PP beads may be obtained by expanding and foaming base resin particles using a blowing agent.

The term "polypropylene resin" as used herein refers to (1) polypropylene homopolymer, (2) a copolymer of propylene and one or more comonomers having a propylene content of at least 70 mole %, preferably at least 80 mole %, a mixture of two or more of the copolymers (2), or a mixture of the homopolymer (1) and the copolymer (2). The copolymer may be, for example, ethylene-propylene random copolymers, ethylene-propylene block copolymers, propylene-butene random copolymers or ethylene-propylene-butene random copolymers.

If desired, the base resin may contain one or more additional resins or one or more elastomers. The amount of the additional resin or elastomer in the base resin is preferably no more than 35 parts by weight, more preferably no more than 20 parts by weight, still more preferably no more than 10 parts by weight, most preferably no more than 5 parts by weight, per 100 parts by weight of the polypropylene resin. Examples of the additional resins include polyethylene resins such as high density polyethylenes, medium density polyethylenes, low density polyethylenes, linear low density polyethylenes, linear very low density polyethylenes, ethylene-vinyl acetate copolymers, ethylene-acrylic acid copolymers, ethylene-methacrylic copolymers; and polystyrene resins such as polystyrene and styrene-maleic anhydride copolymers. Examples of elastomers include ethylene-propylene rubber, ethylene-1-butene rubber, propylene-1-butene rubber, styrene-butadiene rubber, isoprene rubber, neoprene rubber, nitrile rubber, styrene-butadiene block copolymers and hydrogenated products of the above rubbers and copolymers.

The base resin may also be blended with one or more additives such as an antioxidant, a UV absorbing agent, a foam controlling agent, an antistatic agent, a fire retardant, a metal-deactivator, a pigment, a nucleus agent, a filler, a stabilizer, a reinforcing material and a lubricant. The foam controlling agent may be, for example, an inorganic powder such as zinc borate, talc, calcium carbonate, borax or aluminum hydroxide. The additive or additives are generally used in an amount of 20 parts by weight or less, preferably 5 parts by weight or less, per 100 parts by weight of the base resin. These additives may be incorporated into the expanded PP beads during the fabrication of raw material non-expanded PP beads by kneading the base resin together with the additives. The kneaded mixture is generally extruded through a die into strands, which are then cut into pellets to obtain the raw material non-expanded PP beads. The non-expanded PP beads are thereafter expanded as will be described in detail hereinafter.

It is important that at least one of the sections of the composite PP molding should be formed from specific expanded beads of a high modulus base resin which includes a polypropylene resin and which has a tensile modulus of at least 1,200 MPa, since otherwise it is difficult to prevent shrinkage and expansion of the PP molding. The tensile modulus of the high modulus base resin is preferably at least 1,250 MPa, more preferably at least 1300 MPa. The upper limit of the tensile modulus is generally 2,500 MPa, though a base resin having a tensile modulus of more than 2,500 MPa may be used for the purpose of the present invention.

The high tensile modulus base resin may be obtained by using, for example, a high modulus polypropylene resin having a tensile modulus of at least 1,200 MPa, preferably at least 1,250 MPa, more preferably at least 1300 MPa. The upper limit of the tensile modulus of the high modulus polypropylene resin is generally 2,500 MPa, though a high modulus polypropylene resin having a tensile modulus of more than 2,500 MPa may be used for the purpose of the present invention. Such a high tensile modulus of the polypropylene resin may be obtained by using a homopolypropylene or a propylene copolymer having a high propylene monomer unit content (preferably at least 99% by weight). The tensile modulus of the high modulus polypropylene resin is preferably at least 1,250 MPa, more preferably at least 1300 MPa. The upper limit of the tensile modulus is generally 2,500 MPa, though a polypropylene resin having a tensile modulus of more than 2,500 MPa may be used for the purpose of the present invention.

The "tensile modulus" as used herein is measured according to the method disclosed in Japanese Industrial Standard JIS K7161-1994 using Type 1A test sample (directly prepared by injection molding) at a test speed of 1 mm/min.

When the high modulus polypropylene resin is used as a base resin for the specific expanded PP beads in conjunction with one or more additional resins, one or more elastomers or one or more additives, the amount thereof should be such that the tensile modulus of the base resin composition should not decrease below 1,200 MPa and should be preferably at least 1,250 MPa, more preferably at least 1,300 MPa.

The high modulus polypropylene resin for the specific expanded PP beads preferably has a melting point of at least 145° C., more preferably at least 155° C., still more preferably at least 160° C., for reasons of high heat resistance and high compression strength of the PP molding. The melting point of the high modulus polypropylene resin is generally 170° C. or less.

The high modulus polypropylene resin preferably has a tensile yield point of at least 31 MPa, more preferably at least 32 MPa, for reasons of high compression strength of the PP molding. The tensile yield point of the high modulus polypropylene resin is generally 45 MPa or less. The high modulus polypropylene resin also preferably has a tensile breaking elongation of at least 20%, more preferably at least 100%, most preferably 200–1000%, for reasons of prevention of breakage of cells during the fabrication of expanded PP beads and during the fabrication of PP moldings. The tensile yield point and tensile breaking elongation are measured in accordance with the method of Japanese Industrial Standard JIS K6758-1981.

It is further preferred that the high modulus polypropylene resin for the specific expanded PP beads have molecular distribution Mw/Mn of at least 4.4, more preferably 4.5–10, for reasons of capability of using low temperature steam for heating the expanded PP beads in a mold for the fabrication of a PP molding. The weight average molecular weight Mw and the number average molecular weight Mn are measured by gel permeation chromatography (GPC) using polystyrene as standard under the following conditions:
GPC device: Waters 150 C
Column: Toso GMHHR-H(S)HT
Detector: RI detector for liquid chromatogram
Solvent: 1,2,4-trichlorobenzene
Temperature: 145° C.
Elution rate: 1.0 mL/min
Sample concentration: 2.2 mg/mL
Sample injection amount: 160 µL
Calibration curve: Universal Calibration
Analysis program: HT-GPC (Ver. 1.0)

For reasons of strengths of PP moldings and capability of using a low temperature steam in the fabrication of PP moldings, the high modulus polypropylene resin preferably has a melt flow rate (MFR) of 1–100 g/10 min, more preferably 10–70 g/10 min. The MFR herein is as measured in accordance with the Japanese Industrial Standard JIS K7210-1976, Test Condition 14.

The high modulus polypropylene resin is commercially available and may be suitably produced by, for example, a slurry or bulk polymerization process or by a multi-polymerization process including a slurry or bulk polymerization method (e.g. a multi-stage polymerization process including liquid phase polymerization and bulk polymerization) such that the polymer obtained (inclusive of a product obtained after the removal of atactic components) has an isotactic index (content of boiling n-heptane insoluble matters) of at least 85% by weight, isotactic (mmmm) pentads, as determined by $^{13}$C-NMR analysis, of 85–97.5%, a weight average molecular weight of at least 200,000 (preferably 200,000–550,000) and a number average molecular weight of at least 20,000 (preferably 20,000–53,000). In this case, by selecting polymerization or copolymerization conditions so as to provide a propylene component content of at least 99%, the desired high modulus polypropylene resin may be easily obtained. Polypropylene resins obtained by a slurry or bulk polymerization process or by a multi-polymerization process including a slurry or bulk polymerization method are more suited for use as the base resin in the present invention than those obtained by other polymerization processes are. Both metallocene catalyst and Ziegler-Natta catalyst may be suitably used for the production of the high modulus polypropylene resin, though the Ziegler-Natta catalyst is more preferred in the case of the slurry or bulk polymerization process or the multi-polymerization process.

The resin particles used as a raw material for the production expanded PP beads (inclusive of the specific expanded PP beads) may be obtained by any suitable known method. For example, the above-described base resin containing the high modulus polypropylene resin, which is generally in the form of pellets, and, if desired, one or more additives are charged, mixed and kneaded in an extruder. The kneaded mass is then extruded through a die into strands and cut to obtain the resin particles. The resin particles are then expanded using a blowing agent to obtain expanded PP beads.

It is preferred that the strands be quenched immediately after having been extruded for reasons that the succeeding surface modification with an organic peroxide, which will be described hereinafter, may be efficiently performed. The quenching may be carried out by introducing the strands in water at 50° C. or less, preferably 40° C. or less, more preferably 30° C. or less. The cooled strands are taken out of the water and cut into particles each having a length/diameter ratio of 0.5–2.0, preferably 0.8–1.3, and a mean weight of 0.1–20 mg, preferably 0.2–10 mg. The mean weight is an average of 200 arbitrarily selected particles.

It is preferred that the resin particles used for the production of expanded PP beads, especially the specific expanded PP beads, be previously subjected to surface modification with an organic peroxide. The expanded PP beads obtained from such surface modified resin particles have excellent fuse-bonding properties and give a high rigidity PP molding in a mold using steam at a relatively low temperature.

In performing the surface modification, the resin particles are dispersed in a dispersing medium containing an organic peroxide to obtain a dispersion. Any dispersing medium may be used as long as it can disperse the resin particles therein without substantially dissolving components of the particles. Examples of the dispersing medium include water, ethylene glycol, glycerin, methanol, ethanol or a mixture of them. An aqueous dispersion medium, such as ion-exchanged water containing an alcohol may be suitably used. The dispersion is heated at a temperature lower than the melting point of the base resin but sufficient to decompose the organic peroxide, thereby obtaining surface-modified resin particles. The surface-modified resin particles are then expanded using a blowing agent to obtain expanded PP beads.

Any organic peroxide may be used for the purpose of the present invention as long as it decomposes when heated at a temperature lower than the melting point of the base resin.

Illustrative of suitable organic peroxides are shown below:
Isobutylperoxide [50° C./85° C.]
Cumyl peroxy neodecanoate [55° C./94° C.]
α,α'-Bis(neodecanoylperoxy)diisopropylbenzene [54° C./82° C.],
di-n-Propyl peroxydicarbonate [58° C./94° C.],
Diisopropyl peroxydicarbonate [56° C./88° C.],
1-Cyclohexyl-1-methylethyl peroxy neodecanoate [59° C./94° C.],
1,1,3,3-Tetramethylbutyl peroxy neodecanoate [58° C./92° C.],
Bis(4-t-butylcyclohexyl) peroxydicarbonate [58° C./92° C.],
Di-2-ethoxyethyl peroxydicarbonate [59° C./92° C.],
Di(2-ethylhexylperoxy)dicarbonate [59° C./91° C.]
t-Hexyl peroxy neodecanoate [63° C./101° C.],
Dimethoxybutyl peroxydicarbonate [64° C./102° C.],
Di(3-methyl-3-methoxybutylperoxy)dicarbonate [65° C./103° C.],
t-Butyl peroxy neodecanoate [65° C./104° C.],
2,4-Dichlorobenzoyl peroxide [74° C./119° C.],
t-Hexyl peroxy pivalate [71° C./109° C.],
t-Butyl peroxy pivalate [73° C./110° C.],
3,5,5-Trimethylhexanoyl peroxide [77° C./113° C.],
Octanoyl peroxide [80° C./117° C.],
Lauroyl peroxide [80° C./116° C.],
Stearoyl peroxide [80° C./117° C.],
1,1,3,3-Tetramethylbutyl peroxy 2-ethylhexanoate [84° C./124° C.],
Succinic peroxide [87° C./132° C.],
2,5-Dimethyl-2,5-di(2-ethylhexanoylperoxy)hexane [83° C./119° C.], 1-Cyclohexyl-1-methylethyl peroxy 2-ethylhexanoate [90° C./138° C.],
t-Hexyl peroxy 2-ethylhexanoate [90° C./133° C.],
t-Butyl peroxy 2-ethylhexanoate [92° C./134° C.],
m-Toluoyl benzoyl peroxide [92° C./131° C.],
Benzoyl peroxide [92° C./130° C.],
t-Butyl peroxy isobutylate [96° C./136° C.],
1,1-Bis (t-butylperoxy)-2-methylcyclohexane [102° C./142° C.],
1,1-Bis(t-hexylperoxy)-3,3,5-trimethylcyclohexane [106° C./147° C.],
1,1-Bis(t-butylperoxy)-3,3,5-trimethylcyclohexane [109° C./149° C.],
1,1-Bis(t-hexylperoxy)cyclohexane [107° C./149° C.],
1,1-Bis(t-butylperoxy)cyclohexane [111° C./154° C.],
2,2-Bis (4,4-dibutylperoxycyclohexyl)propane [114° C./154° C.],
1,1-Bis(t-butylperoxy)cyclododecane [114° C./153° C.],
t-Hexyl peroxy isopropyl monocarbonate [115° C./155° C.],
t-Butyl peroxy maleic acid [119° C./168° C.],
t-Butyl peroxy 3,5,5-trimethylhexanoate [119° C./166° C.],
t-Butyl peroxy laurate [118° C./159° C.],
2,5-Dimethyl-2,5-di (m-toluoylperoxy)hexane [117° C./156° C.],
t-Butyl peroxy isopropyl monocarbonate [118° C./159° C.],
t-Butyl peroxy 2-ethylhexyl monocarbonate [119° C./161° C.],
t-Hexyl peroxy benzoate [119° C./160° C.], and
2,5-Dimethyl-2,5-di (benzoylperoxy)hexane [119° C./158° C.], These organic peroxides may be used alone or in combination. The amount of the organic peroxide in the dispersion is generally 0.01–10 parts by weight, preferably 0.05–5 parts by weight, more preferably 0.1–3 parts by weight, per 100 parts by weight of the resin particles.

In the dispersion obtained by dispersing the resin particles in a dispersing medium containing an organic peroxide, it is preferred that the weight ratio of the resin particles to the dispersing medium be 1.3:1 or less, more preferably 1.2:1 or less, much more preferably 1.1:1 or less, most preferably 1:1 or less, for reasons of uniformly treating the particles with the organic peroxide. Namely, when the weight ratio of the resin particles to the dispersing medium is excessively high, a difficulty might be caused in uniformly treating the surfaces of the resin particles. Thus, a part of the resin particles which excessively undergo the surface modification tend to for an aggregate in the dispersion so that the discharge of the dispersion from the vessel at the time of the expansion is not smoothly carried out. From the standpoint of economy, the weight ratio of the resin particles to the dispersing medium is desirably at least 0.6:1, more preferably at least 0.7:1.

In the present invention, the organic peroxide is heated at a temperature lower than the melting point of the base resin but sufficient to substantially decompose the organic peroxide. It is preferred that 1 Hr half life temperature Th (the temperature at which the amount of the organic peroxide decreases to half when the peroxide is heated at that temperature for 1 hour) of the organic peroxide be not higher than the Vicat softening point of the base resin. The "Vicat softening point" in the present specification is in accordance with Japanese Industrial Standard JIS K 6747-1981. When the 1 Hr half life temperature Th is higher than the Vicat softening point of the base resin, it is difficult to substantially decompose the organic peroxide at a temperature lower than the melting point of the base resin. When the decomposition of the organic peroxide is carried out at a temperature not lower than the melting point of the base resin, the decomposed organic peroxide will attack not only the surfaces of the resin particles but also inside regions thereof, so that expanded PP beads obtained cannot give a desired PP molding.

Thus, it is preferred that the 1 Hr half life temperature Th be lower by at least 20° C., more preferably by at least 30° C., than the Vicat softening point of the base resin. It is also preferred that the 1 Hr half life temperature Th be in the range of 40–100° C., more preferably 50–90° C., for reasons of easiness of handling.

The organic peroxide in the dispersion is desirably substantially decomposed at a temperature not higher than, more preferably lower by at least 20° C. than, most preferably lower by at least 30° C. than, the Vicat softening point of the base resin. Further, the organic peroxide in the dispersion is desirably substantially decomposed at a temperature not lower than the glass transition point of the base resin, more preferably at a temperature in the range of 40–100° C., most preferably 50–90° C., for reasons of easiness in handling of the peroxide.

It is further preferred that the decomposition of the organic peroxide be performed by maintaining the organic peroxide at a temperature in the range of (Tn−30° C.) to (Tn+30° C.) for at least 10 minutes, where Tn is 1 min half life temperature of the organic peroxide (the temperature at which the amount of the organic peroxide decreases to half when the peroxide is heated at that temperature for 1 minute) for reasons of decomposition efficiency. When the decomposition is carried out at a temperature lower than (Tn−30° C.), a long time is required for completing the decomposition. Too high a decomposition temperature in excess of (Tn+30° C.) might adversely affect the uniformity of surface treatment. From the standpoint of process cost and efficiency, the heat treatment at a temperature of (Tn−30° C.) to (Tn+30° C.) is desired to be performed for 60 minutes or shorter. Preferably, the dispersion of the resin particles in the organic peroxide-containing liquid medium is prepared at such a temperature that the peroxide is prevented from decomposing and, then, the temperature is increased continuously or stepwise so that the peroxide is maintained at a temperature range of (Tn−30° C.) to (Tn+30° C.) for at least 10 minutes. In this case, it is preferred that the peroxide be maintained at a constant temperature of (Tn−5° C.) to (Tn+5° C.) for at least 5 minutes.

The "glass transition point" as used herein is measured in accordance with JIS K7121-1987 and is calculated from the midpoint of a heat flux. The "glass transition point is measured after the sample has been heat treated under specified conditions".

The term "substantially decompose" as used herein means that the active oxygen content of the peroxide is reduced to less than 50% of the original value. Preferably, the peroxide is decomposed so that the active oxygen content thereof be reduced to 30% or less, more preferably 20% or less, most preferably 5% or less of the original value.

The "1 hour half life temperature Th" and "1 min half life temperature Tn" of the organic peroxide are measured as follows. A sample peroxide is dissolved in a suitable solvent inert to radicals, such as benzene or mineral spirit, to obtain a solution having a peroxide concentration of 0.1 mol/L or 0.05 mol/L. This is placed in a glass tube whose inside space has been substituted by nitrogen. The glass tube is sealed and immersed in a constant temperature bath maintained at a predetermined temperature for a given period (1 minute or 1 hour) to permit the peroxide to decompose. The change in concentration of the organic peroxide with the time is measured. Under the above reaction conditions, since the decomposition reaction of the organic peroxide can be regarded as being a first-order reaction, the following equations can be formed:

$$dx/dt=k(a-x)$$

$$\ln[a/(a-x)]=kt$$

wherein x denotes a concentration of the organic peroxide, a denotes the initial concentration of the organic peroxide, k denotes the decomposition rate constant, and t denotes a time. Since the half-life period $t_{1/2}$ is a time required for reducing the concentration of the organic peroxide to half by decomposition (x=a/2), the following relationship is obtained:

$$kt_{1/2}=\ln 2.$$

From the above measurement of the change in concentration of the organic peroxide with the time (t), relationship between the time (t) and $\ln[a/(a-x)]$ is plotted to give a straight line. The gradient represents the constant (k). Thus, the half life $t_{1/2}$ is calculated from the above equation. The 1 Hr half life temperature and 1 min half life temperature of an organic peroxide are the temperatures at which $t_{1/2}$ of the organic peroxide are 1 hour and 1 minute, respectively.

The surface-modified resin particles are then foamed and expanded to obtain expanded PP beads using a blowing agent. Preferably, the expansion step is carried out by a conventional dispersion method in which the resin particles are dispersed in a dispersing medium in a closed vessel in the presence of a blowing agent and heated to impregnate the resin particles with the blowing agent. While being maintained under a pressurized condition and at a temperature sufficient to expand the resin particles, the dispersion is discharged from the vessel to an atmosphere of a pressure lower than the pressure in the vessel, thereby obtaining expanded PP beads.

While the surface modification of the resin particles with the organic peroxide and the subsequent expansion of the surface-modified resin particles may be carried out in separate vessels, it is preferred that the expansion step be carried out by the dispersion method and that the expansion step be carried out in the same vessel for reasons of efficiency. Namely, the surface modification the resin particles and expansion of the surface-modified resin particles may be carried out by simply conducting the dispersion method after addition of a predetermined amount of the organic peroxide in the dispersion.

In performing the expansion, it is preferred that the weight ratio of the surface-modified resin particles to the dispersing medium be 0.5:1 or less, preferably 0.1:1 to 0.5:1, for reasons of prevention of melt adhesion of the surface-modified resin particles in the dispersion. Thus, when the surface modification of the resin particles is carried out in a vessel with the ratio of the resin particles to the dispersing medium being maintained in a range of 0.6:1 to 1.3:1, and when the expansion is performed in the same vessel, a fresh dispersing medium is added to the vessel before subjecting the dispersion to the expansion step.

In the present invention, the polypropylene resin, the high modulus polypropylene resin, the base resin, the resin particles, the surface-modified resin particles, expanded PP beads and PP molding are preferably substantially non-crosslinked. The term "substantially non-crosslinked" as used herein is as defined below. Sample resin is immersed in boiling xylene (100 ml xylene per 1 g sample resin) and the mixture is refluxed for 8 hours. The mixture is then immediately filtered through a 74 µm wire net (specified in Japanese Industrial Standard JIS Z8801-1966). The dry weight of the xylene-insoluble matters left on the wire net is measured. A crosslinking degree P (%) is calculated from the formula:

$$P(\%)=(M/L)\times100$$

wherein M represents the weight (g) of the xylene-insoluble matters and L represents the weight (g) of the sample. "Substantially non-crosslinked" means that the crosslinking degree P is 10% or less.

In the present invention, the crosslinking degree P of the base resin, the resin particles, the surface-treated (or surface modified) resin particles, expanded PP beads and PP molding is preferably 5% or less, more preferably 3% or less, most preferably 1% or less. In general, the surface treatment does not result in an increase of the crosslinking degree P.

The surface-modified resin particles, expanded PP beads obtained therefrom and PP molding obtained from the beads may contain 100–8000 ppm by weight of an alcohol having a molecular weight of 50 or more and produced by the decomposition of the organic peroxide. For example, p-t-butylcyclohexanol may be present in the expanded PP beads, when bis(4-t-butylcyclohexyl)peroxydicarbonate is used as the organic peroxide. i-Propanol, s-butanol, 3-methoxybutanol, 2-ethylhexylbutanol or t-butanol may be detected, when the corresponding peroxide is used.

To prevent melt-adhesion of the surface-treated resin particles with each other during the expansion step, it is desirable to add to the dispersing medium a dispersing agent which is finely divided organic or inorganic solids. For reasons of easiness of handling, the use of an inorganic powder is preferred. Illustrative of suitable dispersing agents are natural or synthetic clay minerals (such as kaolin, mica, pyrope and clay), alumina, titania, basic magnesium carbonate, basic zinc carbonate, calcium carbonate and iron oxide. The dispersing agent is generally used in an amount of 0.001–5 parts by weight per 100 parts by weight of the resin particles.

To improve the dispersing efficiency of the dispersing agent, namely to reduce the amount of the dispersing agent while retaining its function to prevent melt-adhesion of the surface-treated particles, a dispersion enhancing agent may be preferably added to the dispersing medium. The dispersion enhancing agent is an inorganic compound capable of being dissolved in water in an amount of at least 1 mg in 100 ml of water at 40° C. and of providing divalent or trivalent anion or cation. Examples of the dispersion enhancing agents include magnesium chloride, magnesium nitrate, magnesium sulfate, aluminum chloride, aluminum nitrate, aluminum sulfate, ferric chloride, ferric sulfate and ferric nitrate. The dispersion enhancing agent is generally used in an amount of 0.0001–1 part by weight per 100 parts by weight of the resin particles.

The blowing agent may be an organic physical blowing agent or an inorganic physical blowing agent. Examples of the organic physical blowing agents include aliphatic hydrocarbons such as propane, butane, pentane, hexane and heptane, alicyclic hydrocarbons such as cyclobutane and cyclohexane, and halogenated hydrocarbons such as chlorofluoromethane, trifluoromethane, 1,2-difluoroethane, 1,2,2,2-tetrafluoroethane, methylchloride, ethylchloride and methylenechloride. Examples of inorganic physical blowing agents include air, nitrogen, carbon dioxide, oxygen, argon and water. These organic and inorganic blowing agents may be used singly or as a mixture of two or more. For reasons of stability (uniformity) of apparent density of expanded PP beads, low costs and freedom of environmental problem, the use of air or nitrogen is preferred. Water as the blowing agent may be that used in dispersing the surface-modified resin particles in the dispersing medium.

The amount of the blowing agent may be suitably determined according to the kind of the blowing agent, expansion temperature and apparent density of the expanded PP beads to be produced. When nitrogen is used as the blowing agent and when water is used as the dispersing medium, for example, the amount of nitrogen is preferably such that the pressure within the closed vessel in a stable state immediately before the initiation of the expansion, namely the pressure (gauge pressure) in the upper space in the closed vessel, is in the range of 0.6–8 MPa(G). In general, the pressure in the upper space in the closed vessel is desirably increased as the apparent density of the expanded PP beads to be obtained is reduced.

In a method of producing a composite foamed polypropylene resin molding according to the present invention, expanded PP beads are filled in a mold cavity including a plurality of contiguous spaces. The expanded PP beads in each space are then heated to fuse-bond respective expanded resin beads together into a unitary body. The expanded PP beads used should show a high temperature endothermic peak, in a DSC curve thereof, in addition to an intrinsic endothermic peak located at a lower temperature side of the high temperature peak.

The expanded PP beads filled in at least one of the spaces should be specific expanded PP beads which satisfy the following conditions (a) to (c) at the same time:

(a) the specific expanded beads are formed of a base resin having a tensile modulus of at least 1,200 MPa,
(b) the high temperature endothermic peak of the specific expanded beads has an apparent density D1 g/L which is not smaller than 10 g/L but not greater than 700 g/L, and
(c) the high temperature endothermic peak of the specific expanded beads has such an area that corresponds to a calorific of E1 J/g, wherein D1 and E1 have the following relationship $$20-0.014 \times D2 \leq E1 \leq 65-0.072 \times D1.$$

When the apparent density of the specific expanded PP beads is less than 10 g/L, the open cell content is so high that it is difficult to mold the expanded PP beads. When the specific expanded PP beads have an apparent density greater than 700 g/L, it is difficult to obtain expansion forces sufficient to fill the interstices between expanded PP beads filled in the space. The apparent density of the specific expanded PP beads is preferably 20 to 200 g/L, more preferably 30 to 150 g/L.

When the high temperature endothermic peak of the specific expanded PP beads have a calorific value of E1 below [20−0.014×D1] J/g, the shrinkage of the PP molding is significant. When the calorific value E1 of the high temperature peak of the specific expanded PP beads exceeds [65−0.072×D1] J/g, it is difficult to obtain expansion forces sufficient to fill the interstices between expanded PP beads filled in the space.

The apparent density (g/L) is obtained by dividing the weight W (g) of the expanded PP beads by the volume V (L) of the apparent volume thereof (density=W/V). The apparent volume is measured as follows:

In a measuring cylinder, about 5 g of expanded PP beads are allowed to stand at 23° C. for 48 hours in the atmosphere and thereafter immersed in 100 ml water contained in a graduation cylinder at 23° C. From the increment of the volume, the apparent volume can be determined.

In general, a dual density PP molding is apt to expand to a size greater than the mold cavity, when the molding is not sufficiently cooled after the fuse-bonding of expanded PP beads has been completed. The PP molding is also apt to shrink to a size smaller than the mold cavity, when the molding is excessively cooled after the fuse-bonding of expanded PP beads has been completed. Thus, depending upon the degree of cooling, the dual density PP molding expands or shrinks. In this case, since a relatively low density section is more quickly cooled than a relatively high density section, the low density section is more likely to shrink, when the cooling of the molding is carried out evenly. Since expansion is less desirable than shrinkage, the cooling is generally carried out while preventing expansion of the high density section. Thus, the shrinkage of the low density section has been hitherto unavoidable in the case of production of known dual density PP molding unless specifically controlled cooling conditions are adopted. When the degree of shrinkage caused during cooling is relatively small, the shape may return during a succeeding aging stage which is generally carried out at 50–100° C. for 24 hours. When the shrinkage is significant, however, it is impossible to restore the shape.

By using the specific expanded beads formed of the above-described high modulus base resin, on the other hand, a molding produced therefrom does not expand even when the molding is not sufficiently cooled after the completion of the molding process. Further, the molding does not shrink even when it is excessively cooled after the completion of the molding. Therefore, a composite PP molding of the present invention having at least two sections, which are fuse-bonded to each other, which differ from each other in at least one characteristic selected from color, density, composition and mechanical strengths and at least one of which is formed from the specific expanded beads, has good quality, is free of shrinkage or expansion and does not cause breakage at an interface between the sections. Namely, even when the composite PP molding has one or more sections which are not formed from the specific expanded beads, shrinkage can be avoided when cooling is carried out so as to avoid shrinkage of those sections, as long as the composite PP molding has at least one section formed from the specific expanded beads. Especially when each of the different sections is formed from the specific expanded beads, foamed PP moldings free of expansion and shrinkage may be easily obtained even when the cooling time is shortened.

The calorific value of E1 [J/g] of high temperature endothermic peak of the specific expanded PP beads is preferably 10–60%, more preferably 20–50%, based on a total calorific value of the high temperature endothermic peak and the intrinsic peak. The term "calorific value" of the high temperature endothermic peak and the intrinsic peak is intended to refer to heat of fusion in an absolute value.

The DSC curve herein is as obtained by the differential scanning calorimetric analysis wherein a sample (2–10 mg of expanded PP beads) is heated from room temperature (10–40° C.) to 220° C. in an atmosphere of nitrogen at a rate of 10° C./min. FIG. 1 shows an example of a DSC curve having an intrinsic endothermic peak P1 at a peak temperature T1 and a high temperature endothermic peak P2 at a peak temperature T2. The area of a peak corresponds to the heat of fusion thereof.

The area of the high temperature peak P2 is determined as follows. In the DSC curve (first DSC curve) C having two endothermic peaks P1 and P2 at temperatures T1 and T2, respectively, as shown in FIG. 1, a straight line A extending between the point Z1 in the curve at 80° C. and the point Z2 in the curve at a melt completion temperature Tmc is drawn. The melt completion temperature Tmc is represented by a point at which the high temperature peak P2 ends and meets the base line on a high temperature side. Next, a line B which is parallel with the ordinate and which passes a point $B_C$ between the peaks P1 and P2 is drawn. The line B crosses the line A at a point $B_A$. The position of the point $B_C$ is such that the length between the point $B_A$ and the point $B_C$ is minimum. The area of the high temperature peak P2 is the shaded area defined by the line A, line B and the DSC curve C.

A total of the heat of fusion of the high temperature peak P2 and the heat of fusion of the intrinsic peak P1 corresponds to an area defined by the line A and the DSC curve.

When expanded PP beads having a weight per bead of less than 2 mg are measured for the intrinsic peak P1 and high temperature peak P2 using a differential scanning calorimeter, two or more beads are sampled for the measurement such that the total weight of the sample is in the range of 2–10 mg. When expanded PP beads to be measured have a weight per bead of 2–10 mg, one bead is sampled for the DSC measurement. When expanded PP beads to be measured have a weight per bead of more than 10 mg, one of the beads is cut into two or more pieces and one of the pieces having a weight of 2–10 mg is sampled for the DSC measurement. In this case, an expanded PP bead having a weight W and an outer peripheral surface area of S is preferably cut into n number of pieces so that cut pieces have nearly equal weight of W/n and have a surface portion which is derived from the outer peripheral surface of the bead and which has an area of nearly S/n. For example, when the expanded PP beads to be measured have a weight per bead of 18 mg, one of the beads is cut along a plane bisecting the bead and one of the cut pieces is used for measurement. In the present specification, except otherwise noted, the term "heat of fusion of the high temperature peak of expanded PP bead(s)" is intended to refer to the heat of fusion as measured in the above-described method, and should be discriminated from "heat of fusion of the high temperature peak of a surface region or an inside region of an expanded PP bead" which will be described hereinafter.

The above-described high temperature peak P2 is present in the DSC curve measured first. Once the expanded PP beads have completely melted, the high temperature peak P2 no longer appears. Thus, when the sample after the first DSC measurement is cooled to about 40°–50° C. and is measured again for a DSC curve by heating to 220° C. in an atmosphere of nitrogen at a rate of 10° C./min, the second DSC curve does not show such a high temperature peak but contains an endothermic peak attributed to the melting of the base resin, like a DSC curve shown in FIG. 2.

Figure 2:
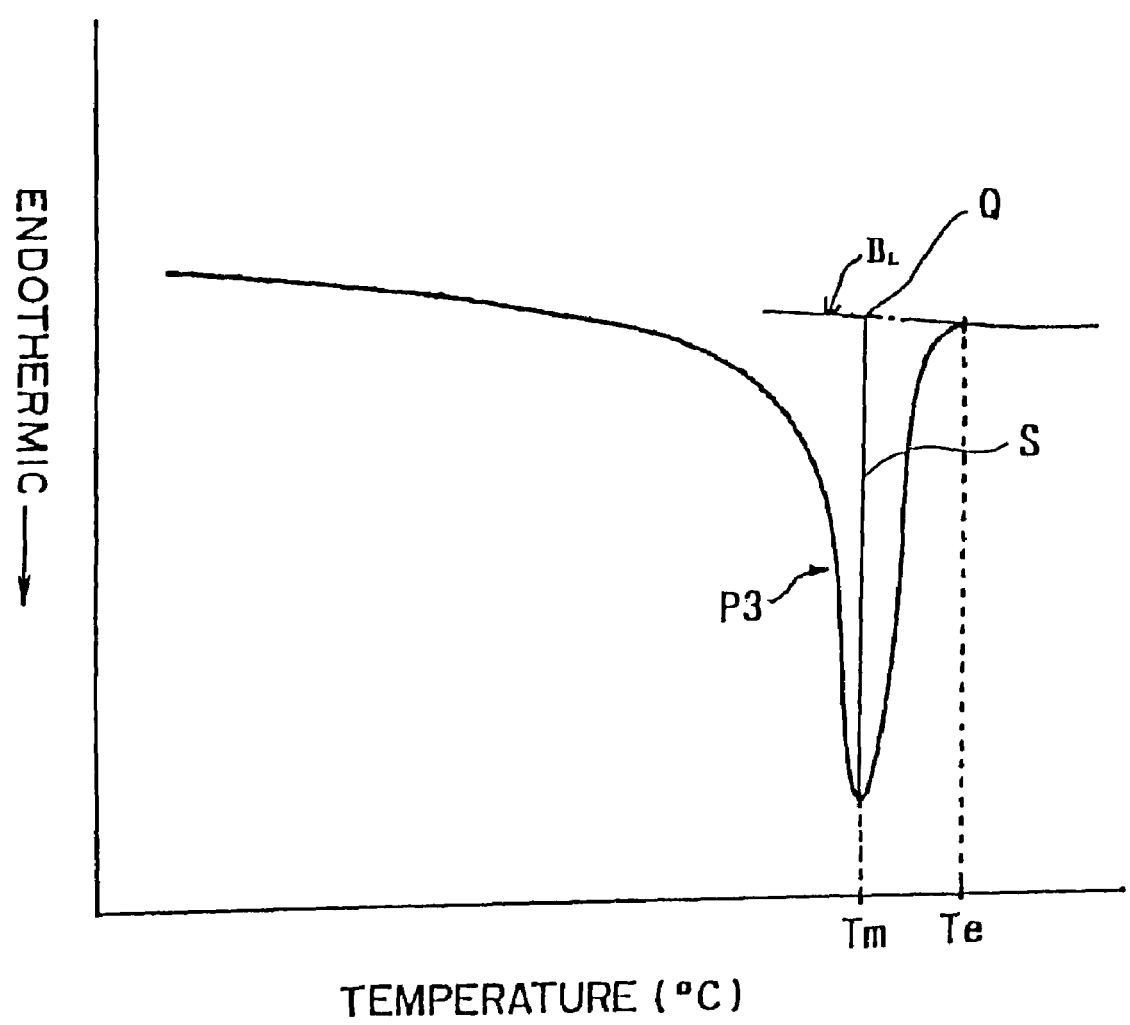
FIG. 2 is a second time DSC curve of polypropylene resin particles which have not yet been subjected to surface modification and which have been once subjected to DSC measurement.

In the present specification and claims, the term "melting point of the base resin" is intended to refer to that measured by DSC analysis of base resin particles which have not yet been subjected to surface modification treatment with an organic peroxide. Namely, "melting point of the base resin" is measured by the differential scanning calorimetric analysis wherein a sample (2–4 mg of resin particles of the base resin) is heated from room temperature (10–40° C.) to 220° C. in an atmosphere of nitrogen at a rate of 10° C./min. The sample is then cooled to room temperature (10–40° C.) and is measured again for a DSC curve by heating to 220° C. in an atmosphere of nitrogen at a rate of 10° C./min to obtain a second DSC curve as shown in FIG. 2. The temperature Tm of the endothermic peak P3 at 130–170° C. in the second DSC curve as shown in FIG. 2 is inherent to the polypropylene resin and represents the "melting point of the base resin". Two or more endothermic peaks might be observed in the second DSC curve, when, for example, the resin particles are composed of two or more different polypropylene resins. In this case, the melting point Tm is the peak temperature of that peak which has the greatest peak height among those peaks. When there are a plurality of peaks having the same greatest peak height, then the melting point Tm is the highest peak temperature among those peaks. The term "peak height" herein refers to the length S between the top of the peak P3 and a point Q at which a line parallel with the ordinate and passing through the top of the peak P3 crosses the base line $B_L$. In FIG. 2, the temperature Te at which the endothermic peak P3 ends and meets the base line $B_L$ refers to the "melt completion temperature of the base resin".

The high temperature peak P2 of expanded PP beads generally appears at a temperature T2 ranging from (Tm+5° C.) to (Tm+15° C.), more generally ranging from (Tm+6° C.) to (Tm+14° C.). The endothermic peak P1 of expanded PP beads generally appears at a temperature T1 ranging from (Tm−5° C.) to (Tm+5° C.), more generally ranging from (Tm−4° C.) to (Tm+4° C.). The endothermic peak in the second DSC measurement of expanded PP beads generally corresponds to that in the second DSC curve of the precursor base resin particles and generally appears at a temperature ranging from (Tm−2° C.) to (Tm+2° C.).

As described above, it is preferred that the expanded PP beads have such a crystal structure that a high temperature peak is present in a first DSC curve thereof in addition to an intrinsic peak. A difference between the melting point of the polypropylene resin and expansion temperature has a great influence upon the heat of fusion (peak area) of the high temperature peak.

The heat of fusion of the high temperature peak of the expanded PP beads is a factor for determining the minimum temperature of steam which provides a saturated steam pressure required for melt-bonding the beads to each other. In general, when the same base resin is used, the smaller the heat of fusion of the high temperature peak, the lower becomes the minimum temperature. Further, the higher the expansion temperature, the smaller becomes the heat of fusion of the high temperature peak.

When expanded PP beads having a small heat of fusion of the high temperature peak are used, the mechanical properties of the resulting PP molding are relatively low, though the minimum temperature required for melt-bonding the beads can be low. On the other hand, when expanded PP beads having a large heat of fusion of the high temperature peak are used, the mechanical properties of the resulting PP molding are relatively high. In this case, however, since the minimum temperature required for melt-bonding the beads is high, it is necessary to use high pressure steam for the production of PP moldings. Thus, the most preferred expanded PP beads would be such that the heat of fusion of the high temperature peak thereof is large but the minimum temperature required for melt-bonding the beads is low. The expanded PP beads obtained from the surface-modified resin are such ideal expanded PP beads. Such expanded PP beads can give a high rigidity PP molding without using a high temperature steam.

The expanded PP beads providing a DSC curve having such a high temperature peak can be suitably produced by maintaining the dispersion containing the surface-modified resin particles in a vessel at a first fixed temperature between a temperature lower by 20° C. than the melting point of the base resin (Tm−20° C.) and a temperature lower than the melt completion point of the base resin (Te) for a period of time of preferably 10–60 min, preferably 15–60 min and then discharging the dispersion from the vessel after increasing the temperature of the dispersion to a second fixed temperature between a temperature lower by 15° C. than the melting point of the base resin (Tm−15° C.) and a temperature higher by 10° C. than the melt completion point of the base resin (Te+10° C.) or, if necessary, after maintaining the dispersion at the second fixed temperature for a period of time of 10–60 min.

The area of the high temperature peak mainly depends upon the above first fixed temperature at which the dispersion is maintained before expansion treatment, the time for which the dispersion is maintained at the first fixed temperature, the above second fixed temperature, the time for which the dispersion is maintained at the second fixed temperature, the heating rate at which the dispersion is heated to the first fixed temperature and the heating rate at which the dispersion is heated from the first fixed temperature to the second fixed temperature. The area of the high temperature peak increases with an increase of the retention time at the first and second fixed temperatures. The heating rate (average heating rate from the commencement of heating until the fixed temperature is reached) in each of the heating stage up to the first fixed temperature and the succeeding heating stage from the first fixed temperature to the second fixed temperature is generally 0.5–5° C. per minute. Suitable conditions for the preparation of expanded PP beads having desired heat of fusion of the high temperature peak can be determined by preliminary experiments on the basis of the above points.

The above temperature ranges for the formation of the high temperature peak and for the expansion of the resin particles are suitably adopted in the case where an inorganic physical blowing agent is used. When an organic physical blowing agent is used, the suitable temperature ranges will shift toward low temperature side and vary with the kind and amount of the organic physical blowing agent.

The expanded PP beads (inclusive of the specific expanded PP beads) obtained from the surface-modified resin particles preferably have at least one of the following characteristics.

A surface region of the expanded PP bead preferably has a melting point (Tms) lower than the melting point (Tmi) of an inside region thereof (Tms<Tmi). The difference between the melting point (Tmi−Tms) is preferably at least 0.05° C., more preferably at least 0.1° C., most preferably at least 0.3° C. The melting point Tms is determined as follows. A surface region of the expanded PP bead is cut and about 2–4 mg of such cut samples are collected. The sample is subjected to DSC analysis in the same manner as described previously with regard to the measurement of the melting point Tm. The peak temperature of a peak corresponding to the endothermic peak P3 in the second DSC curve represents the melting point Tms. The melting point Tmi is also measured in the same manner as above except that inside region of the bead is cut and collected.

In the case of the expanded PP bead having a high temperature endothermic peak in a DSC curve thereof, the heat of fusion Hs of the high temperature endothermic peak of the surface region of the bead is preferably smaller than the heat of fusion Hi of the high temperature endothermic peak of the inside region of the bead such that the following relationship is established:

$$Hs<0.86\times Hi$$

for reasons that the expanded PP beads can be molded at a lower temperature as compared with surface unmodified expanded PP beads. Such an effect increases with a decrease of Hs. Thus, the Hs and Hi of the expanded PP bead preferably have the following relationship: Hs<0.83×Hi, more preferably Hs<0.80×Hi, still more preferably Hs<0.75×Hi, yet still more preferably Hs<0.70×Hi, most preferably Hs<0.60×Hi.

Preferably, Hs is not smaller than 0.25×Hi (Hs≧0.25×Hi).

It is also preferred that Hs is in the range of 1.7–60 J/g, more preferably 2–50 J/g, still more preferably 3–45 J/g, most preferably 4–40 J/g, for reasons of availability of a low molding temperature The surface region and inside region of an expanded PP bead are sampled by cutting the bead with a knife or a microtome. The surface region or regions are sliced off the bead at any arbitral position or positions to a thickness of 200 μm or less such that the outer surface of the bead provides one of the both sides of each of the sliced surface regions. Thus, the other side of each of the sliced surface regions does not contain that part of the PP bead which was present at a depth of more than 200 μm before cutting. The depth herein is in the direction from the outer surface of the bead to the center of gravity thereof. When the sliced surface region or regions contain that part of the PP bead which was present at a depth of more than 200 μm, precise data cannot be obtained. When the amount of the surface region or regions sampled from the bead is less than 2 mg, one or more additional beads are cut to collect 2–4 mg of the sample.

The inside region is obtained by removing all of the surface region of the bead up to the depth of 200 μm in the direction from the outer surface of the bead to the center of gravity thereof. When the size of the bead is so small that no inside region is obtainable after removal of surface region of the 200 μm thick, then the inside region is obtained by removing all of the surface region of the bead up to the depth of 100 μm in the direction from the outer surface of the bead to the center of gravity thereof. When the size of the bead is so small that no inside region is obtainable after removal of surface region of the 100 μm thick, then the inside region is obtained by removing all of the surface region of the bead up to the depth of 50 μm in the direction from the outer surface of the bead to the center of gravity thereof.

When the amount of the inside region obtained from one bead is less than 2 mg, one or more additional beads are used to collect 2–4 mg of the sample. The thus collected samples are measured for the melting point and heat of fusion of the high temperature peak according to the method described above.

The expanded PP bead preferably has an MFR value which is not smaller than that of the resin particles before the surface modification with the organic peroxide and which is in the range of 0.5–150 g/10 min, more preferably 1–100 g/10 min, most preferably 10–80 g/10 min. It is also preferred that the MFR value of the expanded PP bead be at least 1.2 times, more preferably at least 1.5 times, most preferably 1.8–3.5 times, that of the resin particles prior to the surface modification.

For measuring the MFR, the expanded PP beads are pressed at 200° C. using a heat press into a sheet having a thickness of 0.1–1 mm. Pellets or columns are prepared from the sheet to obtain a sample. The sample is measured for MFR in accordance with the Japanese Industrial Standard JIS K7210-1976, Test Condition 14. In the measurement of MFR, air bubbles must be removed from the sample. If necessary, heat press treatment should be repeated up to three times in total to obtain bubble-free sheet.

The expanded PP bead preferably has a surface region having a greater oxygen content per unit weight than that of the inside region. When the organic peroxide used for the surface modification of the resin particles is of a type which generates oxygen radicals upon being decomposed, part of the oxygen radicals are bound to surfaces of the particles. The analysis, using an infrared spectrometer equipped with the attenuated total reflectance (ATR analysis), of a surface of a PP molding obtained from expanded PP beads of the present invention shows a stronger absorption at a wavelength of near 1033 $cm^{-1}$ than that of a PP molding obtained from conventional expanded PP beads. Thus, the ratio of the peak height at 1033 $cm^{-1}$ to the peak height at 1166 $cm^{-1}$ in the case of the PP molding of the present invention is greater than that of the conventional molding. Further, the analysis using an energy dispersion spectroscope (EDS) shows that a surface of the expanded PP bead according to the present invention has an oxygen to carbon molar ratio (O/C molar ratio) is 0.2 whereas an inside of the bead has an O/C molar ratio of 0.1. Further, a surface of the conventional expanded PP bead has O/C molar ratio of 0.09. Such an oxygen-added surface of the expanded PP bead is considered to enhance steam permeability thereof. The preferred O/C ratio is at least 0.15.

The minimum temperature required for melt-bonding the surface-modified expanded PP beads is effectively lowered as a result of a reduction of the heat of fusion of the high temperature peak of the surface region of the expanded PP beads and/or as a result of a reduction of the melt initiation temperature of the surfaces of the expanded PP beads.

The expanded PP beads obtained by the above process are aged in the atmosphere. If desired, the PP beads may be treated to increase the pressure inside of the cells thereof and, thereafter, heated with steam or hot air to improve the expansion ratio thereof.

A PP molding may be suitably obtained by a batch-type molding method in which expanded PP beads (if necessary, after being treated to increase the pressure inside of the cells thereof) are filled in a mold adapted to be heated and cooled and to be opened and closed. After closing the mold, saturated steam is fed to the mold to heat and fuse-bond the beads together. The mold is then cooled and opened to take a PP molding out of the mold. A number of molding machines are commercially available. They are generally designed to have a pressure resistance of 0.41 MPa(G) or 0.45 MPa(G). Thus, the above method is generally carried out using steam having a pressure of 0.45 MPa(G) or less, more preferably 0.41 MPa(G) or less.

The above-mentioned treatment of the expanded PP beads to increase the pressure inside of the cells thereof may be carried out by allowing the beads to stand for a suitable period of time in a closed vessel to which a pressurized gas has been fed. Any gas containing an inorganic gas as a major ingredient may be used for the pressure increasing treatment as long as it is in the form of gas under conditions where the expanded beads are treated. Examples of the inorganic gas include nitrogen, oxygen, air, carbon dioxide and argon. Nitrogen or air is suitably used for reasons of costs and freedom of environmental problems.

Described below will be a specific method of increasing the inside pressure of the cells using air and a method of measuring the thus increased inside pressure in the cells.

Expanded PP beads are placed in a closed vessel into which pressurized air is fed. The beads are allowed to stand in the vessel for a certain period of time (generally several hours) while maintaining the pressure inside the vessel at 0.98–9.8 MPa(G) so that the inside pressure of the cells increases. The thus treated expanded PP beads are placed in a mold for the production of a PP foam molding. The inside pressure of the cells Pi (MPa(G)) as used herein is defined as follows:

$$Pi = Wi \times R \times Te/(M \times V)$$

wherein
Wi is an amount of air increased (g),
R is the gas constant and is 0.0083 (MPa·L/(K·mol)),
Te is an ambient temperature and is 296K,
M is the molecular weight of air and is 28.8 (g/mol), and
V is the volume (liter) of the air in the expanded beads.

The amount of air increased Wi (g) is measured as follows.

A quantity of expanded beads whose cells have been just pressurized with air in the vessel are taken out of the vessel and collected in a polyethylene film bag having a size of 70 mm×100 and provided with a multiplicity of perforations each having a size preventing the passage of the beads. The beads in the bag are placed, within 60 seconds after the take-out, on a weighing device provided in a thermostatic space maintained at 23° C. and 50% relative humidity under ambient pressure. The weight Ua (g) of the beads is measured just 120 seconds after the expanded beads have been taken out from the vessel. The expanded beads are then allowed to stand for 48 hours in the space at 23° C. and 50% relative humidity under ambient pressure. The air in the cells of the expanded beads gradually permeates through the cell walls and escapes from the beads. Therefore, the weight of the beads decreases with the lapse of time. However, an equilibrium has been established and the weight decrease no longer occurs after lapse of the 48 hours period. Thus, the weight of the expanded beads Ub (g) is measured in the same space after the lapse of the 48 hours period. Of course, the weight of the polyethylene bag is also measured and taken in consideration. The measurement of the weight should be carried out precisely to the fourth decimal place (0.0001 g). The balance between the weights Ua and Ub represents the amount of gas increased (Wi=Ua−Ub).

The volume of the air in the expanded PP beads V (L) is defined as follows.

$$V(L) = Va - Vb$$

wherein
Va is the apparent volume of the expanded PP beads, and
Vb is the volume of the base resin of the beads and is obtained by dividing the weight of the beads Ub (g) by the density of the base resin (g/L).

The apparent volume Va (L) of the expanded PP beads is measured as follows. The expanded PP beads which have been subjected to the measurement of the weight Ub as described above, are immersed in 100 ml of water at 23° C. contained in a graduated measuring cylinder. From the volume increment, apparent volume Va (L) of the beads is determined. The quantity of the above-described expanded beads sampled and collected in the bag is such that Ub and Va fall within the ranges of 0.5 to 10 g and 50 to 90 $cm^3$, respectively.

The inside pressure Pi of the cells of the expanded PP beads is preferably 0.98 MPa(G) or less, more preferably 0.69 MPa(G) or less, still more preferably 0.49 MPa(G) or less, most preferably 0.1 MPa(G) or less, for reasons of suitable foaming power while permitting a heating medium (saturated steam) to penetrate into the central region of the molding, thereby ensuring fuse bonding of the expanded PP beads into a unitary structure.

Figure 3:
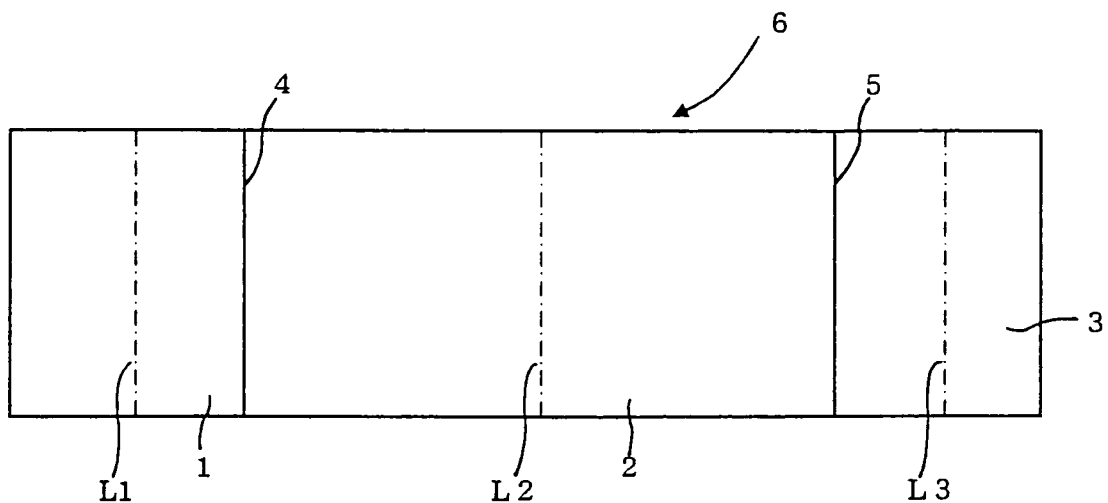
FIG. 3 is a sectional view schematically illustrating one embodiment of a composite foamed polypropylene resin molding according to the present invention.

FIG. 3 schematically depicts one embodiment of a composite PP molding 6 of the present invention. The molding 6 has three, first through third sections 1, 2 and 3. Designated as 4 and 5 are interfaces between the first and second sections 1 and 2 and between the second and third sections 2 and 3, respectively. Each of the first through third sections shows a high temperature endothermic peak, in a DSC curve thereof, in addition to an intrinsic endothermic peak located at a lower temperature side of the high temperature peak.

In the illustrated embodiment, the first through third sections 1, 2 and 3 have apparent densities of $D2_1$, $D2_2$ and $D2_3$, respectively, which satisfy the following conditions:

$$D2_2 > D2_1 \text{ and}$$

$$D2_2 > D2_3.$$

The apparent densities $D2_1$ and $D2_3$ of the first and third sections may be the same or different. Preferably, the apparent density $D2_2$ is 1.2–25 times, more preferably 1.2–20 times, as high as apparent densities $D2_1$ and $D2_3$. The molding 6 as a whole has a low weight because of the presence of the low density sections 1 and 3 and yet exhibits high mechanical strengths because of the presence of the high density section 2.

It is important that at least one of the first through third sections 1–3 should meet the following conditions (d) to (f) at the same time:
  (d) that section is formed from specific expanded polypropylene resin beads of a base resin having a tensile modulus of at least 1,200 MPa,
  (e) that section has an apparent density D2 g/L which is not smaller than 10 g/L but not greater than 500 g/L ($10 \leq D2 \leq 500$), and
  (f) the high temperature endothermic peak of that section has such an area that corresponds to a calorific of E2 J/g, wherein D2 and E2 have the following relationship $$20 - 0.020 \times D2 \leq E2 \leq 65 - 0.100 \times D2.$$

The conditions (e) and (f) are preferably as follows:

$$25 - 0.020 \times D2 \leq E2 \leq 55 - 0.100 \times D2 \quad (e')$$

$$15 \leq D2 \leq 450 \quad (f').$$

Preferably, each of the first through third sections 1–3 meets the above requirements (d) to (f).

An apparent density below 10 g/L will result in considerable reduction of mechanical strengths, while too high an apparent density above 500 g/L fails to contribute to a reduction of weight of the molding. In the embodiment shown in FIG. 3, the apparent density $D2_2$ of the second section 2 is preferably 30–450 g/L, while the apparent densities $D2_1$ and $D2_3$ of the first and third sections 1 and 3 are each less than $D2_2$ and are each preferably 15–90 g/L.

When E2 is less than ($20 - 0.020 \times D2$), shrinkage of that section might be caused when cooling is excessively carried out. On the other hand, when E2 is greater than ($65 - 0.100 \times D2$), that section might not have sufficiently high bonding strength between the cells.

The term "apparent density" of the PP molding as used herein is as specified in JIS K7222-1999. The volume of a PP molding used for the calculation of the apparent density is determined from the external dimensions thereof. When the external shape of the molding is so complicated that the volume thereof is difficult to be determined, then the volume thereof is measured by immersing the molding in water and is given as a volume of water replaced by the molding. To measure the apparent density of a given section of the PP molding, that section is cut out along each interface between adjacent sections. The cut section is then measured for the apparent density in the same manner as that for the above PP molding.

Figure 4:
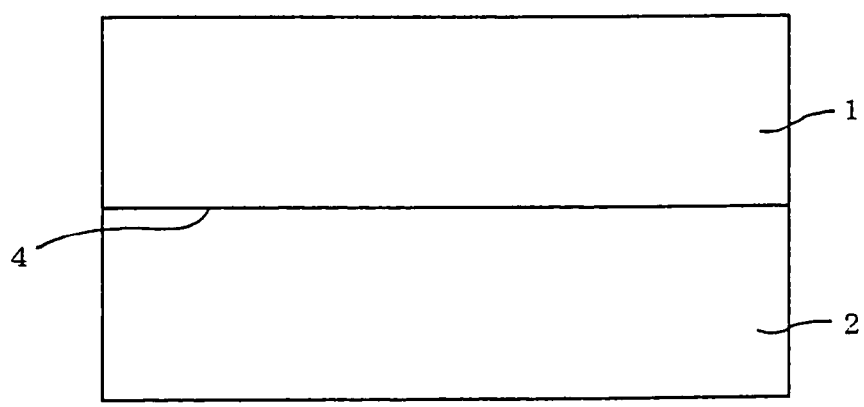
FIG. 4 is a sectional view schematically illustrating another embodiment of a composite foamed polypropylene resin molding according to the present invention.

FIG. 4 schematically illustrate a second embodiment of a composite PP molding of the present invention composed of two different sections 1 and 2 fuse bonded to each other at an interface 4. At least one of (preferably each of) the first and second sections 1 and 2 meets the above requirements (d) to (f) at the same time.

Figure 5:
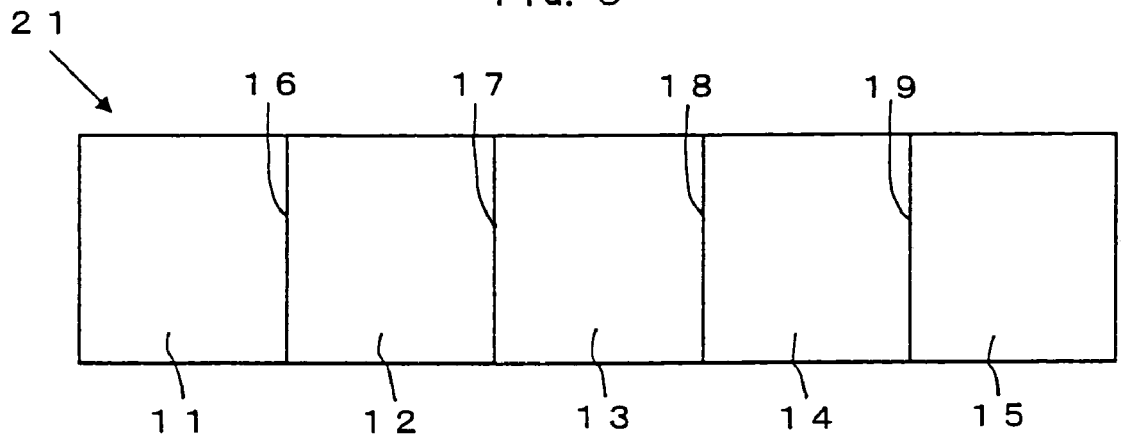
FIG. 5 is a sectional view schematically illustrating a further embodiment of a composite foamed polypropylene resin molding according to the present invention.

FIG. 5 depicts a third embodiment of a composite PP molding 21 of the present invention having five, first through fifth sections 11–15 which are fuse bonded at interfaces 16–19. The first through fifth sections 11–15 have apparent densities of $D2_{11}$, $D2_{12}$, $D2_{13}$, $D2_{14}$ and $D2_{15}$, respectively, which satisfy the following conditions:

$$D2_{13} > D2_{12} > D2_{11} \text{ and}$$

$$D2_{13} > D2_{14} > D2_{15}$$

At least one of (preferably each of) the first through fifth sections 11–15 meets the above requirements (d) to (f) at the same time.

The first through third embodiments shown in FIGS. 3 through 5, in which adjacent two sections are directly fuse-bonded to each other, may be suitably prepared using a molding method disclosed in, for example, Japanese Laid-Open Patent Publications No. H11-334501, No. 2000-16205, No. 2001-63496, No. 2001-150471 and No. 2002-172642, Japanese Examined Patent Publication No. S62-22352 and U.S. Pat. No. 5164257, entire disclosure of which is hereby incorporated by reference herein.

Figure 6:
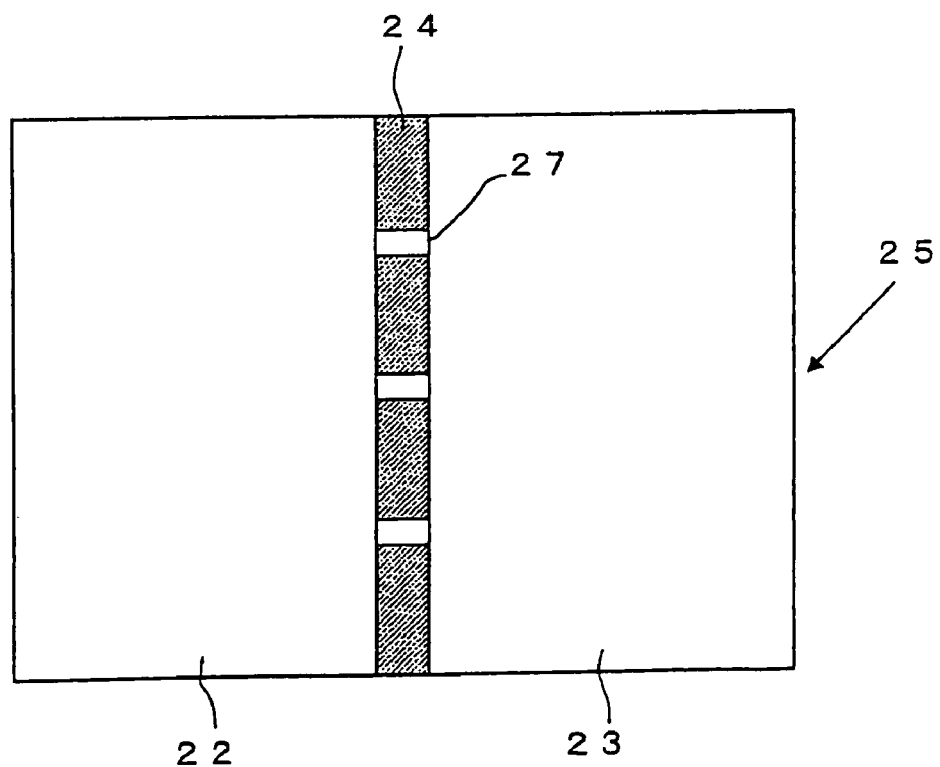
FIG. 6 is a sectional view schematically illustrating a further embodiment of a composite foamed polypropylene resin molding according to the present invention.

If desired, two sections are fuse-bonded to each other through an insert interposed therebetween. One such an embodiment is shown in FIG. 6. Designated as 22 and 23 are first and second sections which are fuse-bonded to each other through an insert 24 interposed therebetween to form a composite PP molding 25. At least one of (preferably each of) the first and second sections 22 and 23 meets the above requirements (d) to (f) at the same time.

In molding expanded PP beads to obtain the composite PP molding 25, the insert 24 is placed in a mold cavity to partition the mold cavity into two, contiguous first and second spaces. Each of the spaces is then filled with required expanded PP beads. Thus, the insert 24 serves as a partition between the first and second spaces. The beads are then heated to fuse-bond respective expanded resin beads in each space together to obtain the composite PP molding 25 having the insert 24 sandwiched between the first and second sections 22 and 23.

The fuse-bonding of the first and second sections 22 and 23 through the insert 24 is not always sufficiently high when the affinity between the insert and the sections 22 and 23 is not high. In such a case, it is preferred that the insert 24 be provided with one or more perforations 27, because part of the first and second sections 22 and 23 can be directly fuse-bonded to each other through the perforations 27 to enhance the bonding strength therebetween.

The insert 24 may be a sheet, net or plate of an any desired material such as metal, glass, ceramic or plastic. The thickness of the insert 24 is not specifically limited but is generally 1–10 mm, preferably 2–8 mm. The perforations 27 formed in the insert 24 may be in the form of, for example, holes or slits. The size of the perforation 27 is such that the expanded particles to be placed on at least one of the both sides of the insert 24 are unable to pass therethrough. Generally, the area of the perforation 27 is in the range of 0.2S–0.9S, preferably 0.5S–0.8S, where S is a central sectional area of the smallest expanded particle used. The size and number of the perforations 27 are such that the adjacent two sections 22 and 23 can be directly fuse-bonded to each other through the perforations 27 to provide sufficient bonding strength therebetween. Generally, a total area of the perforations 27 is 25–90%, preferably 50–80%, of an area of the insert 24.

The composite PP molding of the present invention may be also produced by a continuous method in which expanded PP beads (if necessary, after being treated to increase the pressure inside of the cells thereof) are fed to a path which is defined between a pair of belts continuously running in the same direction and which has a heating zone and a cooling zone. During the passage through the heating zone, the expanded PP beads are heated with saturated steam and fuse-bonded to each other. The resulting molding is cooled in the cooling zone, discharged from the path and cut to a desired length. The above continuous method is disclosed in, for example, Japanese Laid-Open Patent Publications No. H09-104026, No. JP-A-H09-104027 and No. JP-A-H10-180888, the disclosure of which is hereby incorporated by reference herein.

A surface layer, such as a reinforcing layer or a decorative layer) may be integrally provided on a surface of the above composite PP molding. A method of producing such a composite article is disclosed in, for example, U.S. Pat. Nos. 5,928,776, 6,096,417, 6,033,770 and 5,474,841, European Patent No. 477476, International Publications No. WO98/34770 and No. WO98/00287 and Japanese Patent No. 3092227, the disclosure of which is hereby incorporated by reference herein.

An insertion material (together with or without using the above-described insert 24) may be integrated with the above PP molding such that at least part of the insertion material is embedded therein. A method of producing such a composite article is disclosed in, for example, U.S. Pat. Nos. 6,033,770 and 5474841, Japanese Laid-Open Patent Publications No. S59-127714 and Japanese Patent No. 3092227, the disclosure of which is hereby incorporated by reference herein.

When the composite PP molding has a first section made from the above-described specific PP beads and a second section provided adjacent to the first section and made from expanded PP beads which do not meet with one or more of the above-described conditions (a)–(c), it is preferred that the weights and calorific values of the high temperature endothermic peaks of the first and second sections have the following condition:

$$[(C1 \times d1)+(C2 \times d2)]/(d1+d2) > 22 \ [J/g]$$

wherein C1 and C2 represent the calorific values [J/g] of the first and second sections, respectively, and d1 and d2 represent the weights of the first and second sections, respectively.

The PP molding of the present invention preferably has an open cell content (according to ASTM-D2856-70, Procedure C) of 40% or less, more preferably 30% or less, most preferably 25% or less, for reasons of high mechanical strengths.

The composite PP molding may be suitably used as a shock absorber such as an automobile bumper core, a pat for an automobile door, a helmet core or a container.

The following examples will further illustrate the present invention. Parts are by weight.

PREPARATION EXAMPLES 1–4, 8 AND 9

Preparation of Expanded PP Beads:

100 Parts of polypropylene homopolymer (base resin) having a melting point, MFR and a tensile strength indicated in Table 1 were blended with 0.05 part of zinc borate powder (cell controlling agent) and the blend was kneaded in an extruder and extruded into strands. The strands were immediately introduced in water at 25° C. for quenching. The cooled strands were taken out from the water and then cut into particles each having a length/diameter ratio of about 1.0 and a mean weight of 2 mg.

In a 400 liter autoclave, 100 kg of the above resin particles were charged together with 120 kg of ion-exchanged water at 25° C. (dispersing medium; weight ratio of the resin particles to the dispersing medium: 0.83), 0.002 kg of sodium dodecylbenzenesulfonate (surfactant), 0.4 kg of kaolin powder (dispersing agent), 0.013 kg of aluminum sulfate powder (dispersion enhancing agent), and 0.32 kg of bis(4-t-butyl-cyclohexyl)peroxydicarbonate (organic peroxide). The mixture in the autoclave was heated to 90° C. at an average heating rate of 5° C./min with stirring and maintained at that temperature for 10 minutes. Then, 100 kg of ion-exchanged water and carbon dioxide (blowing agent) were fed to the autoclave under pressure until the inside pressure thereof was stabilized at 0.49 MPa(G). The dispersion in the autoclave was then stirred, heated to a temperature lower by 5° C. than the expansion temperature shown in Table 1 at an average heating rate of 4° C./min. Thereafter, the temperature was raised with stirring to a temperature lower by 1° C. than the expansion temperature at an average heating rate of 0.16° C./min. Subsequently, a high pressure carbon dioxide gas (blowing agent) was charged in the autoclave until the inside pressure shown in Table 1 was reached. The temperature was raised to the expansion temperature at an average heating rate of 0.029° C./min. Then, one end of the autoclave was then opened to discharge the dispersion to the atmosphere to obtain expanded PP beads. The discharge was carried out while feeding carbon dioxide gas such that the pressure within the autoclave was maintained at a pressure equal to the pressure in the autoclave immediately before the commencement of the discharge. The expanded PP beads were washed, centrifuged and allowed to stand in the atmosphere at 23° C. for 24 hours for aging, thereby obtaining Beads Nos. 1–4, 8 and 9. The Beads Nos. 1–4, 8 and 9 were then measured for heat of fusion of a high temperature peak of thereof (one bead as a whole), heat of fusion of high temperature peaks of surface and inside regions thereof and apparent density thereof. The results are summarized in Table 1. The Beads Nos. 1–4, 8 and 9 were found to be substantially non-crosslinked (the boiling xylene insoluble content was 0).

PREPARATION EXAMPLES 5–7

Preparation of Expanded PP Beads:

Using polypropylene homopolymer (base resin) having a melting point, MFR and a tensile strength indicated in Table 1, resin particles were prepared in the same manner as that of the above Preparation Examples.

In a 400 liter autoclave, 100 kg of the thus obtained resin particles were charged together with 220 kg of ion-exchanged water (dispersing medium; weight ratio of the resin particles to the dispersing medium: 0.45), 0.005 kg of sodium dodecylbenzenesulfonate (surfactant), 0.3 kg of kaolin powder (dispersing agent), and 0.01 kg of aluminum sulfate powder (dispersion enhancing agent). Then, carbon dioxide (blowing agent) was fed to the autoclave under pressure until the inside pressure thereof was stabilized at 0.49 MPa(G). The dispersion in the autoclave was then stirred, heated to a temperature lower by 5° C. than the expansion temperature shown in Table 1 at an average heating rate of 4° C./min. Thereafter, the temperature was raised with stirring to a temperature lower by 1° C. than the expansion temperature at an average heating rate of 0.16° C./min. Subsequently, a high pressure carbon dioxide gas (blowing agent) was charged in the autoclave until the inside pressure shown in Table 1 was reached. The temperature was raised to the expansion temperature at an average heating rate of 0.029° C./min. Then, one end of the autoclave was then opened to discharge the dispersion to the atmosphere to obtain expanded PP beads. The discharge was carried out while feeding carbon dioxide gas such that the pressure within the autoclave was maintained at a pressure equal to the pressure in the autoclave immediately before the commencement of the discharge. The expanded PP beads were washed, centrifuged and allowed to stand in the atmosphere for 24 hours for aging, thereby obtaining Beads Nos. 5–7. The Beads Nos. 5–7 were then measured for heat of fusion of a high temperature peak of thereof (one bead as a whole), heat of fusion of high temperature peaks of surface and inside regions thereof and apparent density thereof. The results are summarized in Table 1. The Beads Nos. 5–7 were found to be substantially non-crosslinked (the boiling xylene insoluble content was 0).

molds were located in a fully closed position, a mold cavity having a size of 700 mm (length)×200 mm (width)×50 mm (thickness) was defined therebetween, with the distance between the opposing inside walls of the molds providing the thickness (50 mm) of a molding produced in the mold cavity. Two stainless steel partition plates were disposed in the mold cavity at positions corresponding to the interfaces 4 and 5 so that the mold cavity was divided into three spaces aligning in series along the lengthwise direction of a PP molding to be produced and having lengths of 150 mm (corresponding to the length of the first section 1), 400 mm (corresponding to the length of the second section 2) and 150 mm (corresponding to the length of the first section 3), respectively. The molds were first positioned such that a gap of about 10 mm (the distance between the opposing inside walls of the molds was about 60 mm). Expanded PP beads shown in Tables 2 and 3 were fed to respective spaces of the mold cavity in such a combination that high density beads were filled in the center space (corresponding to the length of the second section 2) and low density beads were filled in both end spaces (corresponding to the length of the first and third sections 1 and 3) and, thereafter, the partition plates were removed from the mold cavity.

The molds were then closed. Steam was fed into the mold cavity to substitute for air. Then, steam at a pressure of 0.8 MPa(G) was fed from a male mold side to the mold cavity until a pressure lower by 0.04 MPa(G) than a predetermined molding pressure shown in Tables 2 and 3 was reached (1st heating step). Next, steam at a pressure of 0.8 MPa(G) was fed from a female mold side to the mold cavity until a pressure lower by 0.02 MPa(G) than the predetermined

TABLE 1

| | Preparation Example No. | | | | | | | | |
|---|---|---|---|---|---|---|---|---|---|
| | 1 | 2 | 3 | 4 | 5 | 6 | 7 | 8 | 9 |
| Base Resin: | | | | | | | | | |
| Melting point (° C.) | 161 | 161 | 161 | 161 | 161 | 144 | 145 | 164.5 | 164 |
| MFR (g/10 min) | 21 | 21 | 21 | 21 | 21 | 7 | 7 | 7 | 7 |
| Tensile modulus (MPa) | 1440 | 1440 | 1440 | 1440 | 1440 | 1120 | 1120 | 1350 | 1350 |
| Expansion Conditions: | | | | | | | | | |
| Temperature (° C.) | 165.7 | 166.0 | 167.4 | 167.0 | 166.0 | 153 | 157 | 166 | 171.5 |
| Pressure stabilized (MPaG) | 2.16 | 2.16 | 1.18 | 1.18 | 2.16 | 2.54 | 0.78 | 2.55 | 1.57 |
| Expanded PP Beads: | | | | | | | | | |
| Surface treatment | yes | yes | yes | yes | no | no | no | yes | yes |
| Apparent density D1 (g/L) | 42 | 66 | 69 | 88 | 35 | 37 | 143 | 99 | 43 |
| Calorific value of high temperature endothermic peak | | | | | | | | | |
| Whole (J/g) | 37.3 | 36.8 | 30.3 | 35.8 | 26 | 12.7 | 7.7 | 59 | 13.1 |
| Surface region (J/g) | 21.0 | 20.3 | 17.5 | 21.0 | 25.0 | 11.5 | 7.0 | 25.0 | 9.8 |
| Inside region (J/g) | 43.0 | 39.1 | 35.0 | 40.5 | 26.5 | 13.0 | 8.0 | 67.0 | 15.0 |
| $(20 - 0.014 \times D1) - (65 - 0.072 \times D1)$ (J/g) | 19.4–62.0 | 19.1–60.2 | 19.0–60.0 | 18.8–58.7 | 19.5–62.5 | 19.5–62.3 | 18.0–54.7 | 18.6–57.9 | 19.4–61.9 |
| Beads No. | No. 1 | No. 2 | No. 3 | No. 4 | No. 5 | No. 6 | No. 7 | No. 8 | No. 9 |

EXAMPLES 1–5 AND COMPARATIVE EXAMPLES 1–5

Using the thus obtained expanded PP beads, composite PP moldings of a shape as shown in FIG. 3 were produced with a molding device which had a male mold and a female mold adapted to be displaced relative to each other. When the two molding pressure was reached (2nd heating step). Finally, steam was fed from the both male and female sides to the mold cavity until the predetermined molding pressure was reached and, thereafter, the mold cavity was maintained at that temperature for 20 seconds (3rd heating step). Then, the molds were cooled with water until a surface pressure on the molding of 0.059 MPa(G) was reached. The molding was taken out of the mold cavity, dried at 60° C. and allowed to stand in a chamber at 23° C. and a relative humidity of 50% for 24 hours. In the case of Comparative Examples 1–3, the cooling of the molds were started as soon as the predetermined molding pressure was reached, without the maintenance for the 20 seconds. The time required from the commencement of the 1st heating step until the molding pressure was reached was measured, from which a pressure increasing rate was calculated.

The above-mentioned predetermined molding pressure was the minimum steam pressure $P_{min}$ (MPa(G)) required for properly fuse-bonding the beads to each other and determined by repeatedly producing moldings at various saturated steam pressures increasing from 0.15 MPa(G) to 0.55 MPa(G) at an interval of 0.01 MPa(G). Thus, at a pressure ($P_{min}$–0.01 MPa), the beads were incapable of properly fuse-bond together.

The DSC analysis for the measurement of the physical properties of the polypropylene resin and the expanded PP beads was carried out using Shimadzu Heat Flux Differential Scanning Calorimeter DSC-50 (manufactured by SHIMADZU corporation).

In determining the minimum steam pressure $P_{min}$ required for properly fuse-bonding the beads to each other, whether or not the beads were properly bonded to each other was evaluated as follows:

A cut with a depth of 10 mm is formed on one of the two largest sides (700 mm×200 mm) of a sample of PP molding along a bisecting line (L1, L2 and L3) of each of the first through third sections 1, 2 and 3 perpendicular to the longitudinal direction thereof. The sample is then broken into halves along each of the cut lines L1, L2 and L3 by bending. The interface along which the halves have been separated is observed to count a total number C1 of the beads present on the interface and the number C2 of the beads having destroyed cells. When the ratio C2/C1 is at least 0.5 in each of the first through third sections 1, 2 and 3, the sample is regarded as having properly fuse-bonded beads. The ratio C2/C1 increases with an increase of the steam pressure. The minimum steam pressure $P_{min}$ is a pressure at which the ratio C2/C1 is at least 0.5 in each of the first through third sections 1, 2 and 3. At a pressure of ($P_{min}$–0.01 MPa), however, the ratio C2/C1 is lower than 0.5 in at least one of the first through third sections 1, 2 and 3 and the beads are incapable of properly fuse-bond together. The number C1 is a total of the beads having no destroyed cells and the beads having destroyed cells (C2).

The minimum steam pressure $P_{min}$ is shown in Tables 2 and 3. In the case of Comparative Example 4, a molding pressure of 0.44 MPa(G) which is the maximum withstand pressure of the molding device was used. Even at such a high pressure, it was impossible to properly fuse-bond the beads to each other.

TABLE 2

|  |  | Example No. | | | | |
| --- | --- | --- | --- | --- | --- | --- |
|  |  | 1 | 2 | 3 | 4 | 5 |
| Expanded PP Beads | High Density Beads |  |  |  |  |  |
|  | Beads No. | No. 3 | No. 4 | No. 3 | No. 3 | No. 7 |
|  | Inside pressure (MPa) | 0 | 0 | 0 | 0 | 0 |
|  | Low Density Beads |  |  |  |  |  |
|  | Beads No. | No. 1 | No. 1 | No. 2 | No. 5 | No. 1 |
|  | Inside pressure (MPa) | 0 | 0 | 0 | 0 | 0 |
| Molding Conditions | Molding Pressure (MPaG) | 0.41 | 0.41 | 0.41 | 0.43 | 0.41 |
|  | Pressing Rate (MPaG/sec) | 0.041 | 0.046 | 0.037 | 0.039 | 0.046 |
|  | Maintenance Time (sec) | 20 | 20 | 20 | 20 | 20 |
|  | Cooling Time (sec) | 40 | 40 | 40 | 50 | 200 |

TABLE 3

|  |  | Comparative Example No. | | | | |
| --- | --- | --- | --- | --- | --- | --- |
|  |  | Comp. 1 | Comp. 2 | Comp. 3 | Comp. 4 | Comp. 5 |
| Expanded PP Beads | High Density Beads |  |  |  |  |  |
|  | Beads No. | No. 7 | No. 7 | No. 7 | No. 8 | No. 7 |
|  | Inside pressure (MPa) | 0 | 0 | 0 | 0 | 0 |
|  | Low Density Beads |  |  |  |  |  |
|  | Beads No. | No. 6 | No. 6 | No. 6 | No. 6 | No. 9 |
|  | Inside pressure (MPa) | 0 | 0 | 0 | 0 | 0 |
| Molding Conditions | Molding Pressure (MPaG) | 0.33 | 0.33 | 0.33 | 0.44 | 0.41 |
|  | Pressing Rate (MPaG/sec) | 0.013 | 0.013 | 0.013 | 0.059 | 0.050 |
|  | Maintenance Time (sec) | 0 | 0 | 0 | 20 | 20 |
|  | Cooling Time (sec) | 80 | 140 | 200 | 40 | 200 |

Each of the composite PP moldings thus obtained was measured for fuse-bonding efficiency, surface appearance and dimensional stability, weight, compression strength, apparent density (D2), and calorific value (heat of fusion) of the high temperature endothermic peak of DSC curve thereof to give the results shown in Tables 4 and 5.

The use-bonding efficiency was evaluated in terms of whether the ratio C2/C1 was at least 0.5 or not in all the sections, when the molding pressure of 0.44 MPa(G) was adopted as follows:
Good: C2/C1 is at least 0.5
No good: C2/C1 is less than 0.5.

The surface appearance was evaluated with naked eyes as follows:
Good: Top surface is smooth and has good appearance
No good: Significant depressions and protrusions are present.

To evaluate the dimensional stability, the thickness of the composite PP molding at the center of each of the first through third sections 1, 2 and 3 was measured after the dried molding was allowed to stand in a chamber at 23° C. and a relative humidity of 50% for 24 hours. The dimensional stability was evaluated according to the following ratings:

| | |
|---|---|
| Excellent: | 49.0 mm ≤ thickness ≤ 50.0 mm |
| Good: | 48.0 mm ≤ thickness < 49.0 mm or |
| | 50.0 mm < thickness ≤ 51.0 mm |
| Fair: | 47.0 mm ≤ thickness < 48.0 mm or |
| | 51.0 mm < thickness ≤ 52.0 mm |
| No good: | thickness < 47.0 mm or |
| | thickness > 52.0 mm |

The compression strength was measured as follows. The dried molding, after having been allowed to stand in a chamber at 23° C. and a relative humidity of 50% for 14 days, was cut without leaving any outer surfaces thereof to obtain a sample having a size of 50 mm×50 mm×25 mm. The sample was subjected to compression test in accordance with Japanese Industrial Standard JIS Z0234-1976, A method. Thus, the sample was compressed at 23° C. at a loading rate of 10 mm/min until a strain of 55% was reached to obtain a stress-strain curve. The stress at 50% strain represents the compression strength.

TABLE 4

| | Example No. | | | | |
|---|---|---|---|---|---|
| | 1 | 2 | 3 | 4 | 5 |
| High Density Section: | | | | | |
| Fuse-bonding efficiency | Good | Good | Good | Good | Good |
| Surface appearance | Good | Good | Good | Good | Good |
| Dimensional stability | Excellent | Excellent | Excellent | Excellent | Good |
| Weight (g) | 235 | 313 | 237 | 192 | 501 |
| Compression strength (kPa) | 1154 | 1964 | 1154 | 863 | 3134 |
| Apparent density D2 (g/L) | 84 | 111 | 84 | 66 | 190 |
| Calorific value E2 (J/g) | 31.2 | 36.6 | 31.3 | 31.5 | 8.0 |
| $(20 - 0.02 \times D2) -$ | 18.3–56.6 | 17.9–53.9 | 18.3–56.6 | 18.7–58.4 | 16.2–46.0 |
| $(65 - 0.100 \times D2)$ (J/g) | | | | | |
| Low Density Section: | | | | | |
| Fuse-bonding efficiency | Good | Good | Good | Good | Good |
| Surface appearance | Good | Good | Good | Good | Good |
| Dimensional stability | Excellent | Excellent | Excellent | Excellent | Excellent |
| Weight (g) | 191 | 192 | 249 | 148 | 180 |
| Compression strength (kPa) | 598 | 598 | 863 | 340 | 598 |
| Apparent density D2 (g/L) | 51 | 51 | 66 | 38 | 51 |
| Calorific value E2 (J/g) | 38.0 | 37.9 | 37.4 | 27.5 | 38.0 |
| $(20 - 0.02 \times D2) -$ | 19.0–59.9 | 19.0–59.9 | 18.7–58.4 | 19.2–61.2 | 19.0–59.9 |
| $(65 - 0.100 \times D2)$ (J/g) | | | | | |
| Composite PP Molding as a whole | | | | | |
| Weight (g) | 426 | 505 | 486 | 340 | 681 |
| Apparent density (g/L) | 65 | 77 | 74 | 52 | 103 |

TABLE 5

| | Comparative Example No. | | | | |
|---|---|---|---|---|---|
| | Comp. 1 | Comp. 2 | Comp. 3 | Comp. 4 | Comp. 5 |
| High Density Section: | | | | | |
| Fuse-bonding efficiency | Good | Good | Good | No good | Good |
| Surface appearance | Good | Good | Good | No good | Good |
| Dimensional stability | No good | Good | Good | Good | Good |
| Weight (g) | 537 | 547 | 553 | 338 | 540 |
| Compression strength (kPa) | 3134 | 3241 | 3295 | 1020 | 3140 |
| Apparent density D2 (g/L) | 190 | 194 | 196 | 120 | 191 |
| Calorific value E2 (J/g) | 7.9 | 8.0 | 7.9 | 67.1 | 8.0 |

TABLE 5-continued

|  | Comparative Example No. | | | | |
| --- | --- | --- | --- | --- | --- |
|  | Comp. 1 | Comp. 2 | Comp. 3 | Comp. 4 | Comp. 5 |
| (20 − 0.02 × D2) − (65 − 0.100 × D2) (J/g) Low Density Section: | 16.2–46.0 | 16.1–45.6 | 16.1–45.4 | 17.6–53.0 | 16.2–45.9 |
| Fuse-bonding efficiency | Good | Good | Good | Good | Good |
| Surface appearance | Good | Good | Good | Good | Good |
| Dimensional stability | Good | Fair | Fair | No good | No good |
| Weight (g) | 170 | 173 | 178 | 175 | 192 |
| Compression strength (kPa) | 395 | 406 | 417 | 410 | 375 |
| Apparent density D2 (g/L) | 45 | 46 | 47 | 46 | 51 |
| Calorific value E2 (J/g) | 12.9 | 12.8 | 12.9 | 12.8 | 15.2 |
| (20 − 0.02 × D2) − (65 − 0.100 × D2) (J/g) Composite PP Molding as a whole | 19.1–60.5 | 19.1–60.4 | 19.1–60.3 | 19.1–60.4 | 19.0–59.9 |
| Weight (g) | 707 | 720 | 731 | 513 | 429 |
| Apparent density (g/L) | 164 | 167 | 170 | 78 | 65 |

From the results shown in Table 4, it is seen that the composite PP moldings obtained in Examples 1–4, in which the specific expanded PP beads (Beads Nos. 1–5) are used in each of the high and low density sections, show excellent dimensional stability.

In the case of Example 5 in which the specific expanded PP beads (Beads No. 1) are used in the low density section and a low tensile modulus polypropylene is used in the expanded PP beads (Beads No. 7) for the high density sections, good dimensional stability is obtained in the high density sections while retaining excellent dimensional stability in the low density section.

Comparative Examples 1–3 use expanded beads (Beads Nos. 6 and 7) of a low tensile modulus polypropylene in each of the high and low density sections. The molding conditions of Comparative Examples 1–3 are the same except for the cooling time. When the cooling time is short (Comparative Example 1), the dimensional stability of the high density section is poor. While an increase of the cooling time can improve the dimensional stability of the high density section (Comparative Examples 2 and 3), the dimensional stability of the low density section is adversely affected by such an increased cooling time. Thus, comparison of Examples 1–5 with Comparative Examples 1–3 shows that, unless the specific expanded PP beads are used in at least one of the low and high density sections, it is difficult to produce a composite PP molding having good dimensional stability, even when the cooling time is controlled.

In Comparative Example 4, the expanded PP beads (Beads No. 8) used for the high density sections have excessively high calorific value E1 of the high temperature endothermic peak and are not the specific expanded PP beads, although the base resin thereof has a high tensile modulus. The low density section is formed from Beads No. 6 which are not the specific expanded PP beads, either. The high density sections of the composite PP molding of Comparative Example 4 has poor fuse-bonding efficiency and poor surface appearance, in spite of the fact that a high molding pressure (maximum withstand pressure of the molding device used) is employed. The low density section of the composite PP molding of Comparative Example 4 has poor dimensional stability.

In Comparative Example 5, the expanded PP beads (Beads No. 9) used for the low density section have excessively low calorific value E1 of the high temperature endothermic peak and are not the specific expanded PP beads. The high density section is formed from Beads No. 7 which have a low tensile modulus and which are not the specific expanded PP beads. The high density sections have good dimensional stability, good fuse-bonding efficiency and good surface appearance, since the cooling is carried out under conditions suited for the high density sections. However, the low density section has poor stability.

The invention claimed is:

1. A method of producing a composite foamed polypropylene resin molding, comprising:
    providing a mold having a mold cavity including a plurality of contiguous spaces;
    filling expanded beads of a base resin including a polypropylene resin in each of said spaces; and
    heating said expanded beads in each of said spaces to fuse-bond respective expanded beads together to form the composite foamed molding with a plurality of sections, corresponding to the plurality of contiguous spaces, fuse-bonded together, at least two of said sections differing from each other in apparent density;
    wherein each of said expanded beads shows a high temperature endothermic peak, in a DSC curve thereof, in addition to an intrinsic endothermic peak located at a lower temperature side of said high temperature peak, and
    wherein those expanded beads which are filled in at least one of said spaces are specific expanded beads which satisfy the following conditions (a) to (c) at the same time:
    (a) said specific expanded beads are formed of a base resin having a tensile modulus of at least 1,200 MPa,
    (b) said specific expanded beads have an apparent density D1 g/L which is not smaller than 10 g/L but not greater than 700 g/L, and
    (c) the high temperature endothermic peak of said specific expanded beads has a calorific value of E1 J/g, wherein D1 and E1 have the following relationship $20 - 0.014 \times D1 \leq E1 \leq 65 - 0.072 \times D1$.

2. A method as claimed in claim 1, wherein each of said specific expanded beads has a surface region and an inside region, wherein each of said surface and inside regions shows a high temperature endothermic peak, in a DSC curve thereof, in addition to an intrinsic endothermic peak located at a lower temperature side of said high temperature peak, wherein said high temperature endothermic peaks of said surface region and said inside region have calorific values of Hs and Hi, respectively, and wherein Hs and Hi have the following relationship:

$Hs < 0.86 \times Hi$.

3. A method as claimed in claim 1 wherein beads of different density are respectively added to the spaces corresponding to the at least two sections.

* * * * *